US011595575B2

(12) United States Patent
Cho et al.

(10) Patent No.: US 11,595,575 B2
(45) Date of Patent: Feb. 28, 2023

(54) IMAGE SENSOR

(71) Applicant: SAMSUNG ELECTRONICS CO., LTD., Suwon-si (KR)

(72) Inventors: Yang Ho Cho, Seongnam-si (KR); Deokyoung Kang, Suwon-si (KR); Geonwoo Kim, Suwon-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 17/239,268

(22) Filed: Apr. 23, 2021

(65) Prior Publication Data

US 2021/0352209 A1    Nov. 11, 2021

(30) Foreign Application Priority Data

May 11, 2020 (KR) .................. 10-2020-0055588
Oct. 30, 2020 (KR) .................. 10-2020-0143664

(51) Int. Cl.
| | | |
|---|---|---|
| H04N 5/232 | (2006.01) | |
| G03B 30/00 | (2021.01) | |
| H04N 5/225 | (2006.01) | |
| H04N 9/04 | (2006.01) | |
| G02B 3/00 | (2006.01) | |
| G02B 5/00 | (2006.01) | |
| G02B 19/00 | (2006.01) | |
| G06T 5/00 | (2006.01) | |

(52) U.S. Cl.
CPC ....... *H04N 5/23235* (2013.01); *G02B 3/0037* (2013.01); *G02B 5/005* (2013.01); *G02B 19/0076* (2013.01); *G03B 30/00* (2021.01); *G06T 5/003* (2013.01); *H04N 5/2254* (2013.01); *H04N 9/0455* (2018.08)

(58) Field of Classification Search
CPC ............ H04N 5/23235; H04N 5/2254; H04N 9/0455; G02B 3/0037; G02B 5/005; G02B 19/0076; G03B 30/00; G06T 5/003; H01L 27/14627
See application file for complete search history.

(56) References Cited

U.S. PATENT DOCUMENTS 7,009,652 B1    3/2006  Tanida et al.
7,412,107 B2    8/2008  Milanfar et al.
(Continued)

FOREIGN PATENT DOCUMENTS

JP    2010-169709 A    8/2010
JP    2013-175812 A    9/2013
(Continued)

OTHER PUBLICATIONS

"Coded aperture" Wikipedia, Feb. 26, 2021, https://en.wikipedia.org/wiki/Coded_aperture, pp. 1-4 (4 pages total).
(Continued)

*Primary Examiner* — Lin Ye
*Assistant Examiner* — John H Morehead, III
(74) *Attorney, Agent, or Firm* — Sughrue Mion, PLLC

(57) ABSTRACT

An imaging device may code light, passing through an imaging optical lens arranged in a multi-lens array (MLA), and may transmit the light to a sensing element, and the sensing element may restore an image based on sensed information.

21 Claims, 17 Drawing Sheets

(56) References Cited

U.S. PATENT DOCUMENTS

| | | | |
|---|---|---|---|
| 7,724,439 B2 | 5/2010 | Li et al. | |
| 7,940,282 B2 | 5/2011 | Milanfar et al. | |
| 8,098,321 B2 | 1/2012 | Shimoda et al. | |
| 8,237,841 B2 | 8/2012 | Tanida et al. | |
| 8,345,144 B1* | 1/2013 | Georgiev | H04N 9/0451 |
| | | | 359/368 |
| 8,558,940 B2* | 10/2013 | Kusaka | H01L 27/14621 |
| | | | 348/345 |
| 8,724,000 B2* | 5/2014 | Georgiev | G06T 3/4053 |
| | | | 348/307 |
| 8,724,006 B2 | 5/2014 | Brady et al. | |
| 8,947,578 B2 | 2/2015 | Park et al. | |
| 9,273,846 B1 | 3/2016 | Rossi et al. | |
| 9,383,548 B2* | 7/2016 | Lansel | H04N 13/271 |
| 9,473,725 B2 | 10/2016 | Ono | |
| 9,485,397 B2 | 11/2016 | Rudmann et al. | |
| 10,187,627 B2 | 1/2019 | Cho et al. | |
| 10,277,842 B1* | 4/2019 | Cooper | G01S 1/00 |
| 10,863,127 B1* | 12/2020 | Mohammed | G06F 17/16 |
| 2005/0162539 A1 | 7/2005 | Brady et al. | |
| 2008/0137207 A1* | 6/2008 | Jun | G03F 1/70 |
| | | | 430/5 |
| 2009/0305453 A1* | 12/2009 | Yang | H01L 27/14685 |
| | | | 438/70 |
| 2010/0085468 A1 | 4/2010 | Park et al. | |
| 2010/0123811 A1* | 5/2010 | Abe | G01J 1/06 |
| | | | 257/E31.127 |
| 2010/0177205 A1 | 7/2010 | Shimoda et al. | |
| 2010/0265386 A1 | 10/2010 | Raskar et al. | |
| 2013/0027557 A1* | 1/2013 | Hirai | G06V 20/56 |
| | | | 348/148 |
| 2013/0050526 A1* | 2/2013 | Keelan | H01L 27/14627 |
| | | | 250/206 |
| 2015/0201143 A1 | 7/2015 | Ono | |
| 2016/0181309 A1* | 6/2016 | Uehira | H01L 27/14627 |
| | | | 257/432 |
| 2016/0295144 A1* | 10/2016 | Kimura | H01L 27/14603 |
| 2016/0323504 A1* | 11/2016 | Ono | H04N 9/04515 |
| 2017/0039907 A1* | 2/2017 | Jepsen | G02B 5/1842 |
| 2017/0078568 A1 | 3/2017 | Venkataraman et al. | |
| 2017/0111558 A1 | 4/2017 | Brueckner et al. | |
| 2017/0126982 A1* | 5/2017 | Suh | G09G 3/3406 |
| 2017/0374244 A1 | 12/2017 | Swaminathan et al. | |
| 2018/0152692 A1 | 5/2018 | Cho et al. | |
| 2018/0213142 A1* | 7/2018 | Usui | H04N 9/04557 |
| 2019/0041736 A1* | 2/2019 | Grunnet-Jepsen | G06T 7/521 |
| 2019/0068901 A1* | 2/2019 | Martinello | H04N 5/3454 |
| 2019/0116326 A1 | 4/2019 | Perlman et al. | |
| 2019/0215442 A1* | 7/2019 | Kim | H01L 27/14614 |
| 2019/0243175 A1* | 8/2019 | Newton | G09G 3/36 |
| 2019/0313018 A1 | 10/2019 | Ono | |
| 2020/0257929 A1* | 8/2020 | McCloskey | G06V 10/751 |

FOREIGN PATENT DOCUMENTS

| | | |
|---|---|---|
| KR | 10-2014-0014870 A | 2/2014 |
| KR | 10-2019-0053074 A | 5/2019 |
| KR | 10-2019-0060441 A | 6/2019 |
| KR | 10-2021-0051242 A | 5/2021 |
| KR | 10-2021-0081767 A | 7/2021 |

OTHER PUBLICATIONS

Anat Levin et al., "Image and Depth from a Conventional Camera with a Coded Aperture", ACM Transactions on Graphics, Jul. 2007, vol. 26, No. 3, Article 70, pp. 70-71-70-9 (10 pages total).

Communication dated Sep. 20, 2021 issued by the European Intellectual Property Office in counterpart European Application No. 21172002.4.

Max Grosse et al., "Coded Aperture Projection", ACM Transactions on Graphics, vol. 29, No. 3, Article 22, Jun. 2010, 12 pages total, XP058167595.

Ashok Veeraraghavan et al., "Dappled Photography: Mask Enhanced Cameras for Heterodyned Light Fields and Coded Aperture Refocusing", ACM Transactions on Graphics, vol. 26, No. 3, Article 69, Jul. 2007, 12 pages total, XP058336126.

* cited by examiner

IMAGE SENSOR

CROSS-REFERENCE TO RELATED APPLICATION

This application claims priority from Korean Patent Application No. 10-2020-0055588, filed on May 11, 2020, and Korean Patent Application No. 10-2020-0143664, filed on Oct. 30, 2020, in the Korean Intellectual Property Office, the entire disclosures of which are herein incorporated by reference for all purposes.

BACKGROUND

1. Field

Methods and apparatuses consistent with example embodiments of the disclosure are related to sensing an image.

2. Description of Related Art

Due to the development of optical technologies and image processing technologies, image capturing devices are being utilized in a wide range of fields, for example, multimedia content, security or recognition. For example, an image capturing device may be mounted in a mobile device, a camera, a vehicle or a computer, to capture an image, to recognize an object, to acquire data for controlling a device, or the like. A volume of the image capturing device may be determined based on, for example, a size of a lens, a focal length of a lens, and a size of a sensor. If the size of the lens decreases, the focal length of the lens may decrease. To reduce the volume of the image capturing device, a multi-lens including compact and small lenses may be used.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, provided is an image sensor including: a mask array including a plurality of mask elements, the plurality of mask elements being configured to, among light passing through imaging optical lenses and incident onto the mask array in a plurality of directions, block light in a first portion of the plurality of directions, and allow light in a second portion of the plurality of directions to pass therethrough; and a sensing array including a plurality of sensing elements, the plurality of sensing elements being configured to sense the light passing through the imaging optical lenses and the mask array.

The image sensor may further include: a color filter provided above the sensing array and configured to filter light of a portion of wavelength bands from light incident on each of the plurality of sensing elements, wherein the mask array is provided between the color filter and the sensing array.

The image sensor may further include: a condensing lens array provided above the sensing array, wherein the mask array is provided between the condensing lens array and the sensing array.

The mask array and the plurality of sensing elements may be spaced apart from each other by 1 micrometer (μm) or less.

The mask array and the plurality of sensing elements may be in contact with each other.

A first region of the mask array corresponding to a sensing element of the plurality of sensing elements may include: an aperture region occupying an area corresponding to an aperture ratio with respect to a total area of the first region; and a masked region occupying a remaining area of the first region, the plurality of mask elements being provided in the masked region.

The aperture ratio may be between about 40% and about 60%.

In each partial region of the mask array, an area occupied by an aperture nay be greater than or equal to an area corresponding to a set aperture ratio.

The mask array may be segmented into a plurality of group regions corresponding to a plurality of sensing element groups, and each of the plurality of group regions in the mask array may be configured to cover a sensing element group, the sensing element group including a plurality of sensing elements that are grouped to represent a single pixel.

A masking pattern of a group region may be repeated in the mask array.

All of the plurality of group regions in the mask array may have a same masking pattern.

A number of spaces included in a masking pattern, which is repeated in the mask array, may be greater than or equal to a number of the imaging optical lenses.

The plurality of mask elements may have two or more transmission levels.

Each of the plurality of mask elements may be segmented into a plurality of regions, and a transmittance of each of the plurality of mask elements may be determined based on a ratio of an open region and a closed region among the plurality of regions.

The image sensor may further include: a processor configured to restore an image based on sensing information sensed by the plurality of sensing elements.

The processor may be further configured to generate frequency information by transforming the sensing information to a frequency domain, to generate deblurred frequency information by dividing the frequency information by a frequency conversion result of a blur kernel, the blur kernel corresponding to a masking pattern of the mask array, and to restore a high-resolution image by inversely transforming the deblurred frequency information to a time domain.

The mask array may include a plurality of masking patterns, and each of the plurality of masking patterns may be configured to cover a sensing element group, the sensing element group including two or more sensing elements in the sensing array.

According to an aspect of an example embodiment, provided a camera device including: an imaging lens array including imaging optical lenses, the imaging optical lenses configured to transmit light received from an outside of the camera device; a sensing array including a plurality of sensing elements, the plurality of sensing elements being configured to sense light passing through the imaging lens array; and a mask array including a plurality of mask elements, the mask array being provided between the imaging lens array and the sensing array.

The mask array may be provided at one of a position inside the sensing array and a position in contact with the sensing array on the plurality of sensing elements.

A first region of the mask array corresponding to a sensing element of the plurality of sensing elements may include: an aperture region occupying an area corresponding to an aperture ratio with respect to a total area of the first region; and a masked region occupying a remaining area in the first region, the plurality of mask elements provided in the masked region.

In each partial region of the mask array, an area occupied by an aperture may be greater than or equal to an area corresponding to a set aperture ratio.

A masking pattern of a group region may be repeated in the mask array.

The camera device may further include: a processor configured to generate frequency information by transforming sensing information sensed by the plurality of sensing elements to a frequency domain, to generate deblurred frequency information by dividing the frequency information by a frequency conversion result of a blur kernel, the blur kernel corresponding to a masking pattern of the mask array, and to restore a high-resolution image by inversely transforming the deblurred frequency information to a time domain.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1A:
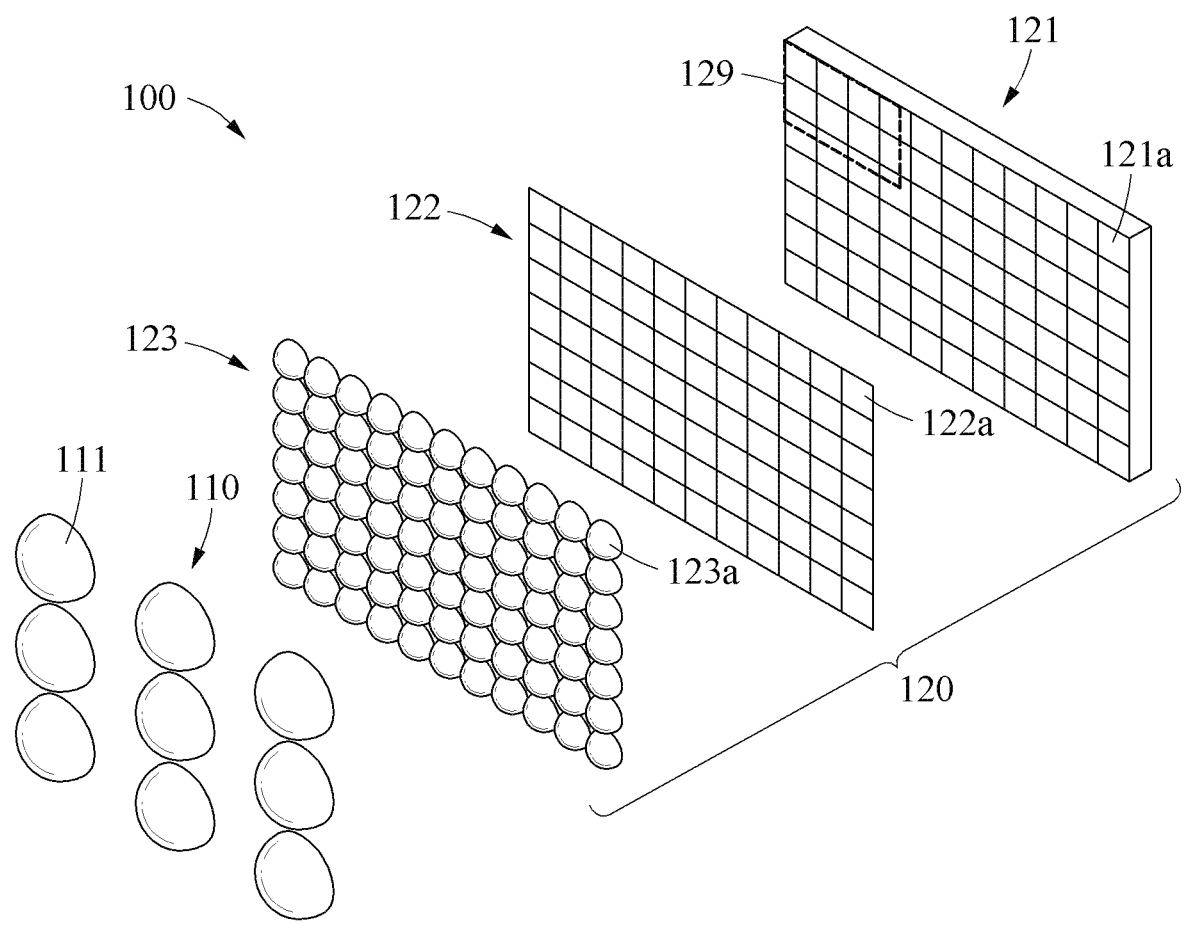
FIGS. 1A and 1B illustrate an example of an imaging device according to an example embodiment.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the disclosure. The drawings may not be to scale, and the relative size, proportions, and depiction of elements in the drawings may be exaggerated for clarity, illustration, and convenience.

Figure 1B:
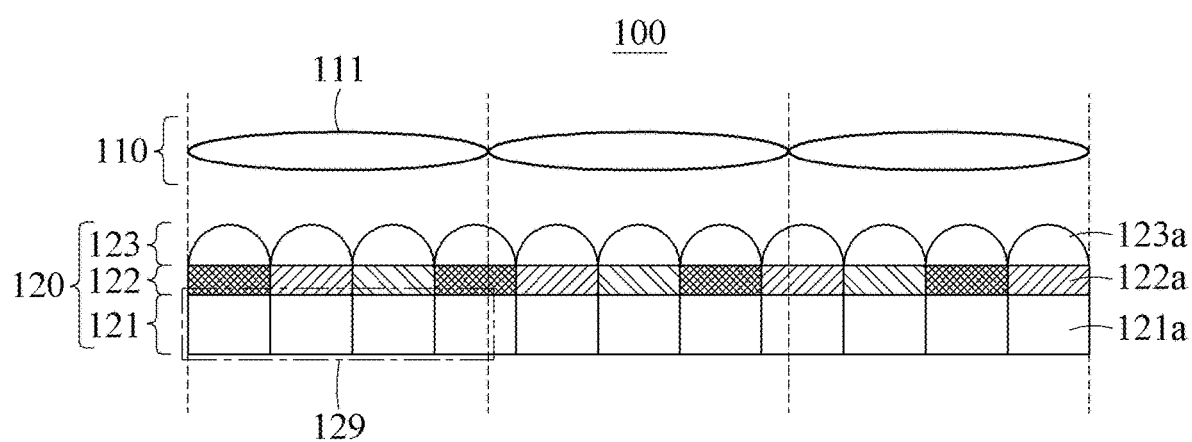

FIGS. 1A and 1B illustrate a structure of an imaging device according to an example embodiment. FIG. 1A is a perspective view of the imaging device, and FIG. 1B is a cross-sectional view of the imaging device.

An imaging device 100 may include a lens array 110 and an image sensor 120. The lens array 110 may include lens elements, and the image sensor 120 may include optical sensing elements. The lens elements may be arranged along a plane of the lens array 110, and the optical sensing elements may be arranged along a plane of a sensing array 121 in the image sensor 120. The plane of the lens array 110 may be placed parallel to the plane of the sensing array 121. The lens array 110 may be a multi-lens array (MLA) for imaging, and may also be referred to as an "imaging lens array."

The term "optical sensing element", hereinafter referred to as a "sensing element", used herein may be an element that senses optical information based on light incident on the element, and may output a value indicating an intensity of incident light. The optical sensing element may include, for example, a complementary metal-oxide-semiconductor (CMOS), a charge-coupled device (CCD), and/or a photodiode.

The term "picture element" that is a pixel may be basic unit information constituting an image and may indicate optical information obtained by sensing light reflected from a physical position on a subject corresponding to a pixel position using a sensing element. The pixel position may be a position of a pixel in an image and may conform to a pixel coordinate system, and the physical position may conform to a world coordinate system.

For reference, pixels constituting a color image may have a plurality of color values (for example, a red value, a green value, and a blue value in an RGB color system) for a single pixel position. A unit pixel of a display in a display field may include sub-pixels (for example, a red sub-pixel, a green sub-pixel, and a blue sub-pixel in an RGB color system) for a plurality of colors to represent color values of a single pixel position. Unlike the display field, in an image sensor field, generally, a pixel is not divided into sub-pixels for each color and refers to a sensing element (for example, a photodiode with a front end in which a color filter is disposed) that senses one color value. Also, in the image sensor field, the term "pixel" may refer to both a single sensing element and a value sensed by the sensing element. However, for clarity of description in example embodiments, the term "pixel" is used herein to indicate basic unit information constituting an image, and the term "sensing element" refers to a hardware element that outputs a pixel value of a pixel in response to light received from a subject, and accordingly meanings of the pixel and the sensing element may be distinguished.

An example in which each pixel is represented by a single sensing element is mainly described in the following description, however, example embodiments are not limited thereto. For example, a single pixel may be represented by a plurality of sensing elements. A plurality of sensing elements grouped to represent a single pixel may be referred to as a "sensing element group". Although an amount of light that may be sensed by a single sensing element is limited, a sensitivity may be enhanced by representing a single pixel using values sensed by a plurality of sensing elements. An example in which a single pixel value is sensed by a sensing element group including four sensing elements will be described below with reference to FIG. 11.

The image sensor 120 may include the sensing array 121, an optical filter 122, and a condensing lens array 123. However, this is merely an example. Instead of the optical filter 122, an individual condensing micro-lens 123a of the condensing lens array 123 may have an optical characteristic of transmitting a predetermined wavelength band and blocking the remaining wavelength bands other than the predetermined wavelength band. In this case, the optical filter 122 may be omitted.

The condensing lens array 123 may include a plurality of condensing micro-lenses 123a configured to concentrate light passing through the lens array 110 onto the sensing array 121. For example, the condensing lens array 123 may include the same number of condensing micro-lenses 123a as the number of sensing elements included in the sensing array 121. The plurality of condensing micro-lenses 123a may be arranged between an imaging optical lens and the sensing array 121, to concentrate and transmit light passing through the imaging optical lens to a sensing element 121a corresponding to each condensing micro-lens 123a. For example, as illustrated in FIG. 1B, a condensing micro-lens 123a may be disposed above each sensing element 121a of the sensing array 121 to concentrate light onto a sensing element 121a located below the condensing micro-lens 123a. Also, as illustrated in FIG. 1B, a color filter 122a may be disposed between the condensing micro-lens 123a and the sensing element 121a.

The optical filter 122 may be a filter having an optical characteristic of transmitting a predetermined wavelength band and blocking the remaining wavelength bands. For example, the optical filter 122 may be implemented as a color filter array (CFA) including a plurality of color filters arranged along a filter plane. Each color filter 122a may be a filter that allows light of a wavelength band corresponding to a predetermined color to pass and that blocks light of the remaining wavelength bands. The color filter 122a may include, for example, a red-pass filter, a green-pass filter, and a blue-pass filter. The red-pass filter may allow light of a wavelength band corresponding to red to pass and may block light of the remaining wavelength bands. The green-pass filter may allow light of a wavelength band corresponding to green to pass and may block light of the remaining wavelength bands. The blue-pass filter may allow light of a wavelength band corresponding to blue to pass and may block light of the remaining wavelength bands. In the color filter array, color filters that individually transmit color light may be arranged in a Bayer pattern or other patterns along the filter plane. The optical filter 122 may also be an infrared cut-off filter that blocks infrared rays while passing visible rays.

A quality of an image captured and restored by the image sensor 120 may be determined based on the number of sensing elements included in the sensing array 121 and an amount of light incident on the sensing element 121a. For example, a resolution of the image may be determined based on the number of sensing elements included in the sensing array 121, and a sensitivity of the image may be determined based on the amount of light incident on the sensing element 121a. The amount of light incident on the sensing element 121a may be determined based on a size of the sensing element 121a. When the size of the sensing element 121a increases, the amount of incident light may increase, and a dynamic range of the sensing array 121 may increase. Accordingly, when the number of sensing elements included in the sensing array 121 increases, a resolution of an image captured by the image sensor 120 may increase. As the size of the sensing element 121a increases, the image sensor 120 may operate more effectively in capturing a high-sensitivity image in a low-illuminance environment.

An individual lens element 111 of the lens array 110 may cover a predetermined sensing region 129 of the sensing array 121 corresponding to a lens size of the individual lens element 111. The sensing region 129 covered (or substantially covered) by the lens element 111 in the sensing array 121 may be determined based on a lens size of the lens element 111. The sensing region 129 may indicate a region in the sensing array 121 in which rays of a predetermined field of view (FOV) arrive after passing through the corresponding lens element 111. A size of the sensing region 129 may be represented by a diagonal length or a distance from a center of the sensing region 129 to an outermost point. In other words, light passing through the individual lens element 111 may be incident on sensing elements included in the sensing region 129.

Each of the sensing elements of the sensing array 121 may generate sensing information based on rays passing through lenses of the lens array 110. For example, the sensing element 121a may sense a value of an intensity of light received through the lens element 111 as sensing information. The imaging device 100 may determine intensity information corresponding to an original signal associated with points included in a view of the imaging device 100 based on the sensing information output by the sensing array 121 and may restore a captured image based on the determined intensity information.

Also, the sensing element 121a may generate, as sensing information, a color intensity value of a corresponding color by sensing light passing through the color filter 122a. Each of the plurality of sensing elements included in the sensing array 121 may be disposed to sense a color different from that sensed by a neighboring sensing element that is disposed spatially adjacent thereto.

When the diversity of sensing information is sufficiently secured and a full rank relationship is formed between the sensing information and original signal information corresponding to the points included in the view of the imaging device 100, a captured image corresponding to a maximum resolution of the sensing array 121 may be obtained. The diversity of the sensing information may be secured based on parameters of the imaging device 100 such as the number of lenses included in the lens array 110 and the number of sensing elements included in the sensing array 121.

In a structure of an MLA for imaging, the imaging optical lens and the sensing array 121 may be arranged based on a fractional alignment structure. For example, the fractional alignment structure may represent a structure in which the sensing region 129 covered by the individual lens element 111 includes a non-integer number of sensing elements.

When the lens elements included in the lens array 110 have the same lens size, the number of lens elements included in the lens array 110 and the number of sensing elements included in the sensing array 121 may be in a relatively prime relationship. A ratio P/L between a number L of lens elements corresponding to one axis of the lens array 110 and a number P of sensing elements corresponding to one axis of the sensing array 121 may be determined to be a real number. Each of the lens elements may cover the same number of sensing elements as pixel offsets corresponding to P/L. For example, the sensing region 129 of FIG. 1A, which may be covered (or substantially covered) by the individual lens element 111, may include "2.3" (=7/3) sensing elements along a vertical axis and "3.67" (=11/3) sensing elements along a horizontal axis. Also, the lens element 111 may cover a plurality of non-integer condensing micro-lenses 123a. Accordingly, in the image sensor 120, the number of condensing micro-lenses 123a may be the same as the number of sensing elements of the sensing array 121. Also, the number of lens elements (for example, imaging optical lenses) of the lens array 110 may be less than the number of condensing micro-lenses 123a.

Through the fractional alignment structure as described above, an optical center axis (OCA) of each lens element 111 in the imaging device 100 may be slightly differently arranged with respect to the sensing array 121. In other words, the lens element 111 may be disposed to be eccentric to the sensing element 121a. Accordingly, each lens element 111 of the lens array 110 may receive different light field (LF) information. LF information received by the fractional alignment structure will be further described below with reference to FIG. 2.

Figure 2:
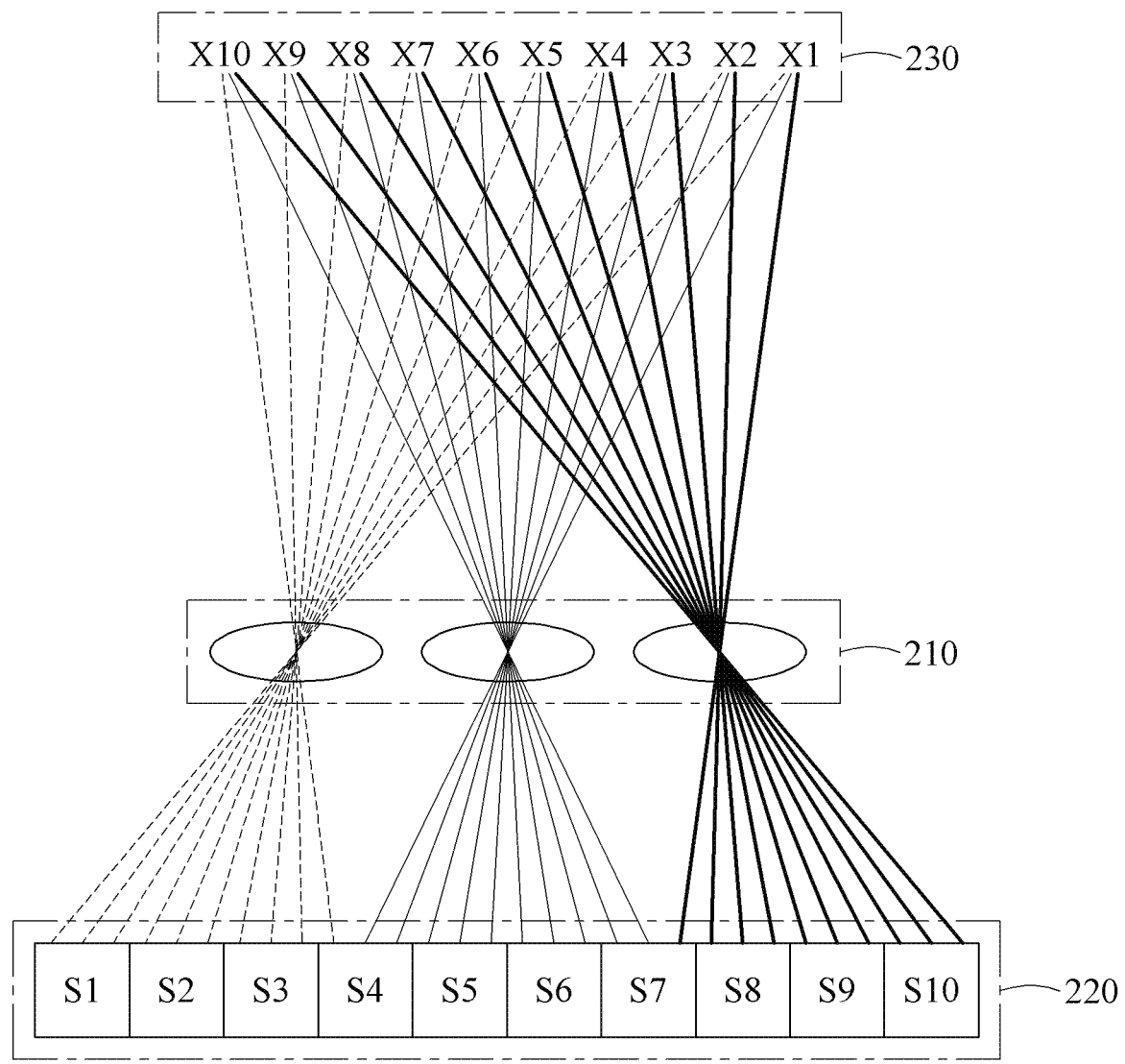
FIG. 2 is a diagram illustrating an example in which a sensing element receives a ray through a lens element according to an example embodiment.

FIG. 2 is a diagram illustrating an example in which a sensing element receives a ray through a lens element according to an example embodiment.

An LF may refer to a field indicating a direction and intensity of rays that are radiated from an arbitrary target point and reflected from an arbitrary point on a subject. LF information may be information obtained by combining a plurality of LFs. Since a direction of a chief ray of each lens element also varies, the sensing regions may receive different LF information. Thus, an imaging device may obtain an optically greater amount of sensing information.

As illustrated in FIG. 2, a sensing array 220 may receive and detect rays corresponding to individual points 230, for example, X1 through X10. A plurality of rays emitted from each of the individual points 230 may form LFs. Rays emitted from a first point X1 may form a first LF and may be incident on a first sensing element S1, a fourth sensing element S4, and a seventh sensing element S7. Rays emitted from remaining points X2 through X10 may also form corresponding LFs. The individual points 230 may be points on a predetermined object, for example, a subject. Rays emitted from the individual points 230 may be rays such as sunlight reflected from an object. As a cross-sectional view illustrating an example of an imaging device, FIG. 2 illustrates a lens array 210 including three lens elements along one axis and the sensing array 220 including ten sensing elements S1 through S10 for convenience of description. However, example embodiments are not limited thereto.

The sensing elements S1 through S10 may sense rays that pass through a plurality of lens elements and that overlap with each other. The sensing element S1 may generate overlapping sensing information, for example, an intensity value, of the rays emitted from the points X1 through X3. Similarly, the sensing elements S2 through S10 may also generate overlapping sensing information of the rays emitted from the plurality of individual points 230. An image sensor may restore the overlapping sensing information.

The sensing information generated by the sensing elements S1 through S10 shown in FIG. 2 may be modeled as original signal information, for example, an intensity value, corresponding to a ray incident from each of the points 230 according to Equation 1 shown below.

$$S = T \cdot X \qquad \text{[Equation 1]}$$

In Equation 1, S denotes a matrix indicating sensing information, for example, a detected intensity value, sensed by individual sensing elements. X denotes a matrix indicating a signal value, for example, a color intensity value of an incident ray, corresponding to rays incident on the sensing elements S1 through S10 from individual points. T denotes a transformation matrix, and may indicate a relationship between the sensing information sensed by the sensing elements S1 through S10 and signal information corresponding to incident light. In the structure shown in FIG. 2, the rays corresponding to the individual points X1 through X10, the lens elements, and the sensing elements S1 through S10 may be modeled as shown in Equation 2 below. In Equation 2, the individual points X1 through X10 may be modeled as being located at infinite focal points from the image sensor. Distances between the image sensor and each of the individual points X1 through X10 may be greater than a threshold distance.

$$\begin{bmatrix} S1 \\ S2 \\ S3 \\ S4 \\ S5 \\ S6 \\ S7 \\ S8 \\ S9 \\ S10 \end{bmatrix} = \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 0 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \qquad \text{[Equation 2]}$$

In Equation 2, for convenience of description, ray signal information, for example, ray intensity values, corresponding to the individual points X1 through X10 are denoted by X1 through X10. In addition, sensing information, for example, sensing intensity values, sensed by the sensing elements S1 through S10 are denoted by S1 through S10. A relationship, for example, the aforementioned transformation matrix, between the sensing information corresponding to the sensing elements S1 through S10 included in the sensing array 220 and original signals corresponding to the rays incident from the individual points X1 through X10 may be determined based on an arrangement of the lens elements and the sensing elements, the number of lens elements included in the lens array 210, and/or the number of sensing elements S1 through S10 included in the sensing array 220.

Equation 2 corresponds to a case in which the individual points X1 through X10 are infinite focal points from the image sensor. When the individual points X1 through X10 are located at finite focal points from the image sensor, an original signal received in each sensing element may vary depending on a distance between a subject and the image sensor and/or a geometric structure of the image sensor.

As described above, the imaging device may acquire a plurality of low-resolution input images based on a variety of acquired sensing information, and may restore an output image with a higher resolution than that of the low-resolution input images from the low-resolution input images. A method of generating a single image by rearranging a plurality of low-resolution input images will be described below with reference to FIG. 3.

Figure 3:
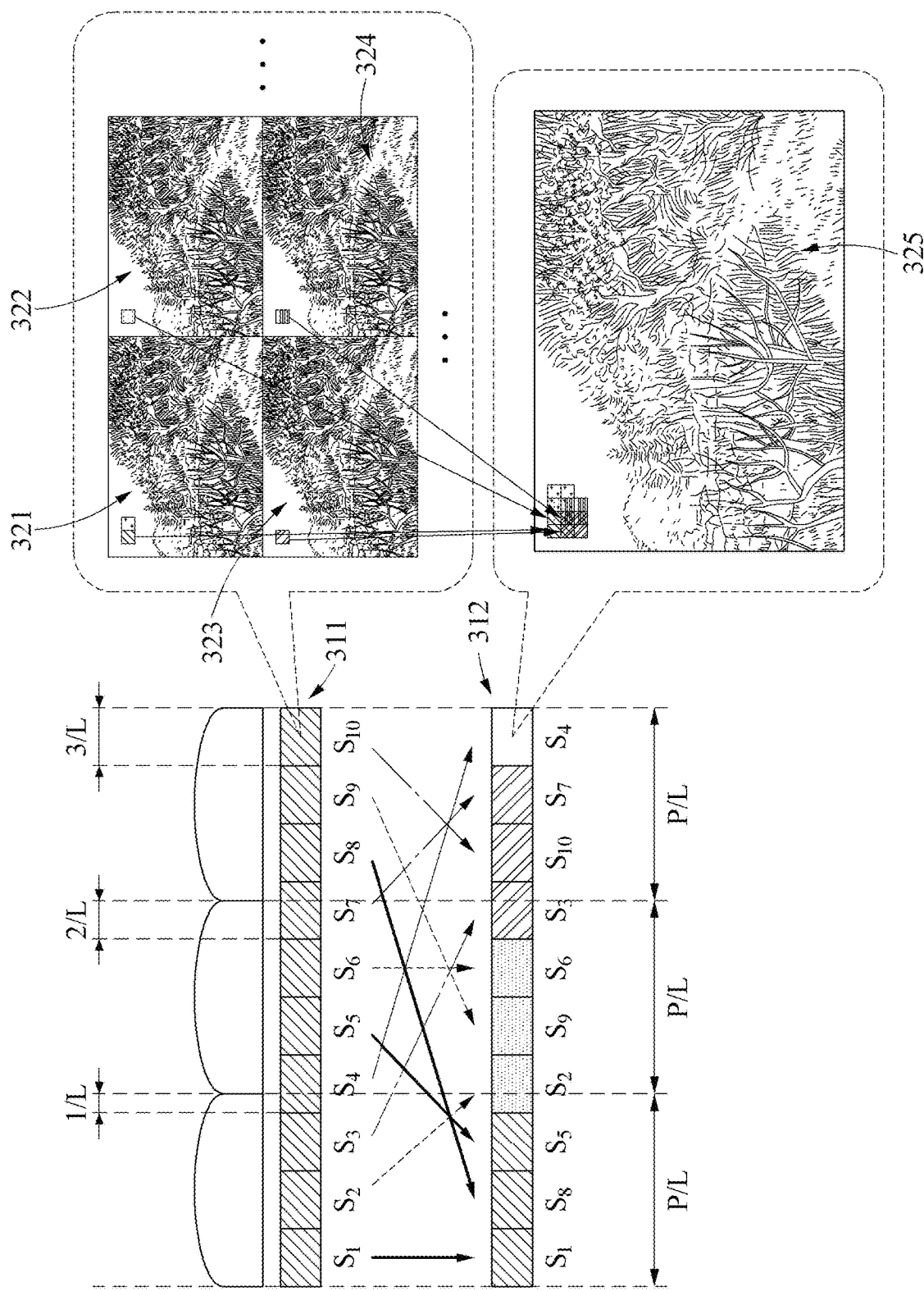
FIG. 3 is a diagram illustrating a relationship between a number of sensing elements and a number of lens elements according to an example embodiment.

FIG. 3 is a diagram illustrating a relationship between a number of sensing elements and a number of lens elements according to an example embodiment.

As described above, an imaging optical lens and a sensing array may be arranged in a fractional alignment structure. FIG. 3 illustrates an example in which a ratio P/L between a number L of lens elements and a number P of sensing elements is 10/3.

Based on the aforementioned geometric structure of the lens array and the sensing array, sensing elements covered by each lens element may receive LF information different from LF information sensed by a sensing element covered by another lens element. For example, in the structure of FIG. 2, the first sensing element S1 may receive LF information including a combination of a first LF of the first point X1, a second LF of the second point X2, and a third LF of the third point X3. On the other hand, in the structure of FIG. 2, a second sensing element S2 neighboring the first sensing element S1 may receive LF information including a combination of a fourth LF, a fifth LF, and a sixth LF. As described above, each sensing element may receive LF information different from LF information sensed by another sensing element.

To restore an image with a high resolution, an imaging device and/or an image sensor may rearrange image pixel positions of pixels indicating the same point or neighboring points on a subject in a plurality of captured low-resolution images, based on a correlation between LF information.

For example, if an image is a color image, the color image may have color values based on a color system as pixel values, but it may be difficult for the image sensor to simultaneously sense three colors at a single point due to a physical limitation. Generally, a color filter capable of allowing only one color to pass is disposed in a front end of a sensing element, and accordingly a color sensible at a position of each of sensing elements may be different from a color sensed by a neighboring sensing element. Accordingly, with respect to a first sensing element (for example, a sensing element with a front end in which a blue-pass filter is disposed) at a predetermined position, the imaging device and/or the image sensor may interpolate a color value (for example, a red value) that is not sensed by the first sensing element by using a color value sensed by a second sensing element (for example, a sensing element with a front end in which a red-pass filter is disposed) adjacent to the first sensing element. The imaging device and/or the image sensor may obtain three color channel images by performing interpolation for each color channel. However, the interpolation of the color value described above is merely an example, and other methods may also be performed depending on a design.

The imaging device and/or the image sensor may rearrange pixels for each color channel, which will be described below. For example, in an RGB color system, the imaging device and/or the image sensor may restore a high-resolution red channel image by rearranging pixels of low-resolution red channel images. Similarly, the imaging device and/or the image sensor may restore a high-resolution blue channel image and a high-resolution green channel image. Thus, the imaging device and/or the image sensor may obtain a high-resolution color image. However, example embodiments are not limited thereto. For example, the imaging device and/or the image sensor may obtain low-resolution color images by merging the three color channel images obtained through the interpolation as described above, and may restore a high-resolution color image by rearranging pixels of the low-resolution color images.

The imaging device and/or the image sensor may construct pixel information of a high-resolution image by rearranging pixel positions of pixels corresponding to sensing elements that receive similar LF information to be adjacent to each other. As described above, each sensing element may receive LF information in which a plurality of LFs overlap. When the number of same LFs included in pieces of information sensed by two sensing elements increases, a correlation between the pieces of information may increase. A rearrangement of pixel positions of the pixels may be performed based on a depth at which a corresponding pixel is captured. In an example, the depth at which the pixel is captured may be set to an arbitrary depth value, estimated through stereo image matching, or measured by a depth sensor. In another example, the pixel positions may also be rearranged by a neural network designed to rearrange the pixel positions based on a depth at which a subject is captured even if the depth at which the pixel is captured is not measured and/or estimated. The aforementioned rearrangement of the pixel positions may also be referred to as a "pixel shuffle". For example, a neural network designed to output a single high-resolution output image in response to an input of a plurality of low-resolution input images may be used to rearrange the pixel positions. The neural network may be trained based on a training data set obtained by capturing a subject at various depths.

The image sensor may assume that points on a subject from which rays are reflected are located at infinite focal points and farther than a threshold distance from the image sensor, and may determine LF information to be sensed in each sensing element. The image sensor may rearrange pixel positions of pixels having an output value output by a sensing element that receive LFs emitted from points spatially adjacent to each other on the subject such that the pixel positions may be adjacent to each other.

For reference, the individual points X1 through X10 are illustrated in FIG. 2 in an order of being spatially adjacent to each other at an infinite focal distance. The first point X1 may be adjacent to the second point X2. The second point X2 may be adjacent to the first point X1 and the third point X3.

Among sensing elements 311 not rearranged yet in FIG. 3, both LF information sensed in the first sensing element S1 and LF information sensed in an eighth sensing element S8 may include LFs corresponding to the second point X2 and the third point X3. Accordingly, the first sensing element S1 and the eighth sensing element S8 may receive similar LF information. Equation 3 represents a result obtained by rearranging pixels corresponding to similar LF information according to Equation 2 above to be adjacent to each other.

$$\begin{bmatrix} S1 \\ S8 \\ S5 \\ S2 \\ S9 \\ S6 \\ S3 \\ S10 \\ S7 \\ S4 \end{bmatrix} = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \\ 1 & 1 & 0 & 0 & 0 & 0 & 0 & 0 & 0 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix}$$ [Equation 3]

Sensing elements 312 rearranged according to Equation 3 may be as shown in FIG. 3. The first sensing element S1 may be covered by a first lens, and the eighth sensing element S8 may be covered by a third lens. Also, a fifth sensing element S5 may be covered by a second lens. Since sensing information sensed in each sensing element corresponds to a pixel constituting an image, the image sensor and/or the imaging device may rearrange pixels such that sensing information corresponding to rays passing through different lenses may be adjacent. A reconstructed image 325 may be an image in which pixel positions of pixels having sensing values obtained by sensing elements receiving similar LF information in low-resolution images 321, 322, 323, and 324 captured by individual lenses are arranged to be adjacent.

Figure 4:
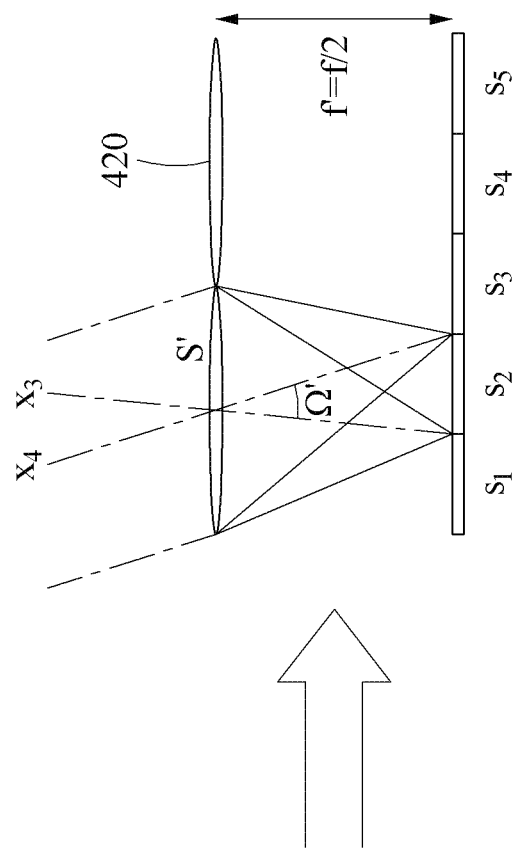
FIG. 4 illustrates a reduction in a focal length based on a structure of a multi-lens array (MLA) in an imaging device according to an example embodiment.
Figure 4:
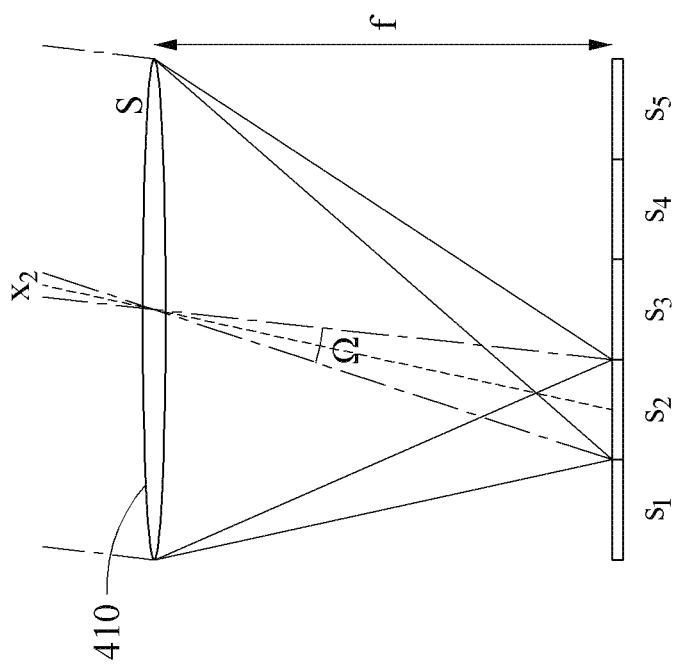

FIG. 4 illustrates a reduction in a focal length based on a structure of an MLA in an imaging device according to an example embodiment.

A volume of the imaging device may be determined by a focal length of a lens element. This is because an image sensor needs to be spaced apart from the lens element by a distance corresponding to the focal length of the lens element to collect light refracted by the lens element. The focal length of the lens element may be determined by a FOV of the imaging device and a size of the lens element. If the FOV is fixed, the focal length may increase in proportion to the size of the lens element. To capture an image in a predetermined FOV range, the size of the lens element may need to increase as a size of a sensing array increases.

As described above, to increase a sensitivity of an image while maintaining a FOV and a resolution of the image, a volume of the image sensor may be increased. To increase the sensitivity of the image while maintaining the resolution of the image, a size of each sensing element may need to be increased while maintaining a number of sensing elements included in the sensing array, and thus the size of the sensing array may increase. To maintain the FOV, the size of the lens element and the focal length of the lens element may increase as the size of the sensing array increases, and thus the volume of the image sensor may increase.

When a size of each lens element included in a lens array decreases, that is, when a number of lenses included in the same area on the lens array increases, a focal length of each lens element may decrease. Thus, a thin camera with a reduced thickness of the imaging device may be implemented. As shown in FIG. 4, a focal length f' of each of an MLA 420 may be reduced in comparison to a focal length f of a single lens 410. For example, if the MLA 420 including "2×2" lenses is used instead of the single lens 410, the focal length f' may be equal to f/2.

However, an incident area S' of an individual lens of the MLA 420 on which light is incident may be less than an incident area S of the single lens 410 on which light is incident. For example, the incident area S' may be equal to S/4. Also, an incident solid angle $\Omega$ corresponding to an angle range of rays incident on an individual sensing element, for example, a sensing element S2, may increase due to a decrease in the focal length. For example, an incident solid angle $\Omega'$ corresponding to an individual lens of the MLA 420 may be equal to $4\Omega$. A blur kernel based on an increase in an incident solid angle will be described below with reference to FIG. 5.

Figure 5:
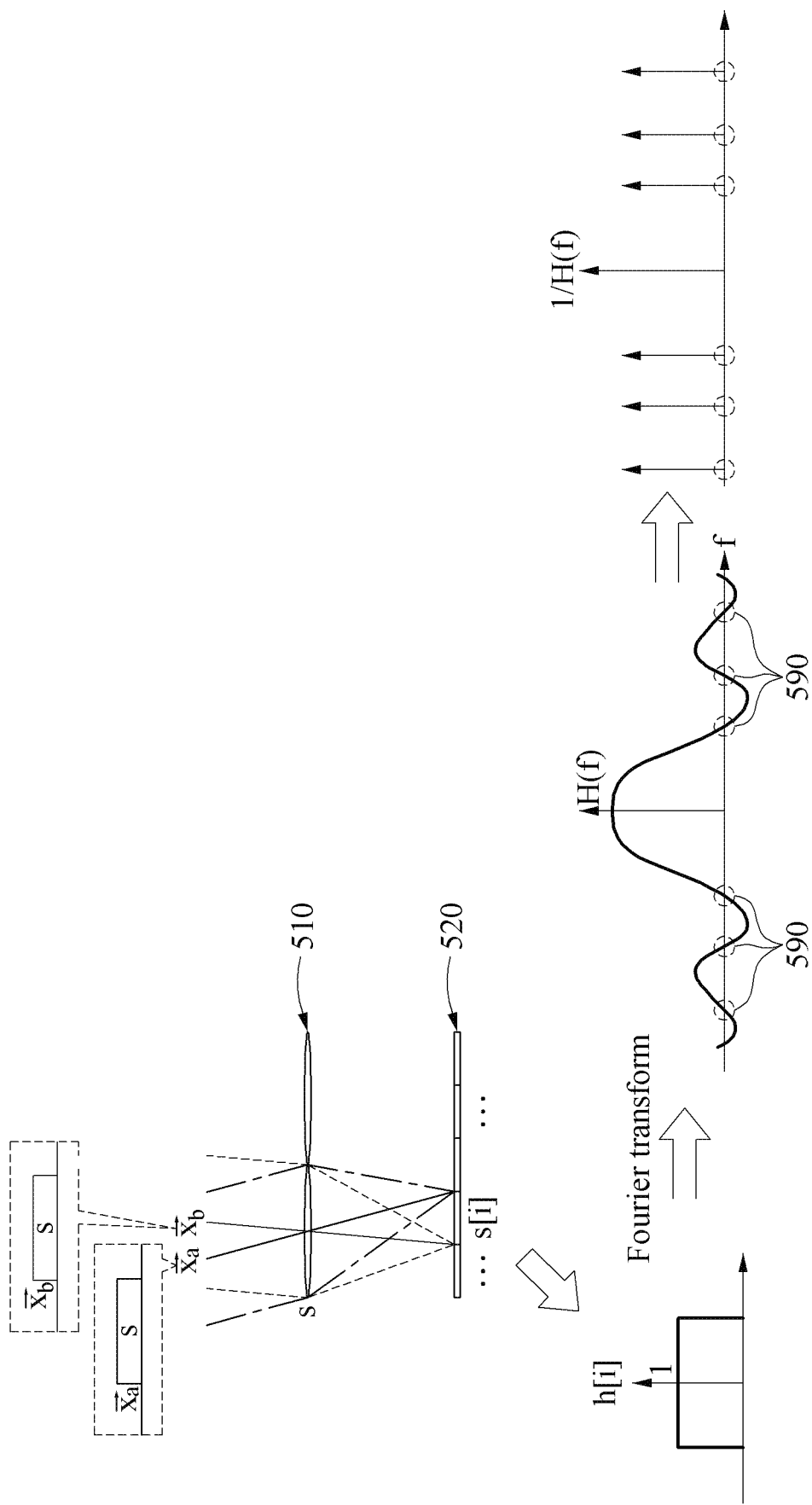
FIG. 5 illustrates a blur kernel based on a structure of an MLA in an imaging device according to an example embodiment.

FIG. 5 illustrates a blur kernel based on a structure of an MLA in an imaging device according to an example embodiment.

When lenses are designed at the same FOV in a structure of an MLA 510, a focal length may decrease and an incident solid angle may increase if a number of lenses for the same area increases as described above with reference to FIG. 4. When the incident solid angle increases, a number of signals overlapping in a sensing element may increase. As signals overlap, information sensed by the sensing element may be blurred. For example, when a FOV is 100 degrees and an image sensor 520 includes "100" sensing elements in an imaging device with a single lens, a FOV of each of the sensing elements may be 1 degree. In an example, if a number of lenses on the same area is "2", "50" sensing elements may be covered by each lens of the image sensor 520. Thus, a FOV of each of the sensing elements may be 2 degrees. In another example, if a number of lenses on the same area is "50", "2" sensing elements may be covered by each lens of the image sensor 520, and a FOV of each of the sensing elements may be 50 degrees. A larger amount of LF information may overlap as a FOV sensible by an individual sensing element increases, and thus a blur level of sensing information may increase.

A blur kernel may be a kernel obtained by modeling a blur caused by overlapping of LF information in an individual sensing element, and may also be referred to as a "blur model" or a "blur filter". LF information of $\vec{x}_a$ through $\vec{x}_b$ may be condensed by a lens aperture S through the MLA 510, and the condensed LF information may be sensed by an i-th sensing element. $\vec{x}_a$ may represent a bundle of rays concentrated on an outermost point of a sensing element, and $\vec{x}_b$ may represent a bundle of rays concentrated on an opposite outermost point of the sensing element. Here, i may be an integer between "1" and "n", inclusive, and n may be a total number of sensing elements included in the image sensor 520. A signal intensity of a bundle of concentrated rays may be represented as shown in Equations 4 and 5 below.

$$x_a = \int_S \vec{x}_a dA$$ [Equation 4]

$$x_b = \int_S \vec{x_b} dA \qquad \text{[Equation 5]}$$

In Equation 4, $x_a$ denotes an intensity of rays concentrated in a direction a. In Equation 5, $x_b$ denotes an intensity of rays concentrated in a direction b.

The i-th sensing element may sense an intensity value obtained by accumulating all LF information within a FOV $\Omega$. An intensity value obtained by accumulating all LF information within a FOV of the i-th sensing element may be discretely approximated, which may be represented as shown in Equation 6 below.

$$s[i] = \int_{\Omega=a}^{\Omega=b} x_\Omega d\theta \approx \sum_{\Omega=a}^{\Omega=b} x_\Omega \qquad \text{[Equation 6]}$$

In Equation 6, s[i] denotes an intensity value sensed by the i-th sensing element. In an imaging device configured with an imaging optical system including the MLA 510, a blur kernel of an image may be modeled so that LF information within a FOV of each sensing element may overlap with the same size, for example, "1". Sensing information s[i] sensed by the i-th sensing element may be modeled as a convolution relationship between original LF information $x_\Omega[i]$ and a uniform blur kernel h[i], as shown in Equation 7 below.

$$s[i] = (x_\Omega[i] * h[i]) + t[i] \qquad \text{[Equation 7]}$$

In Equation 7, h[i] denotes a blur kernel, and t[i] denotes a noise component. If a Fourier transform of Equation 7 is performed, a convolution operation may be replaced by a multiplication, as shown in Equation 8 below.

$$S(f) = X_\Omega(f) \cdot H(f) + T(f) \qquad \text{[Equation 8]}$$

In Equation 8, $X_\Omega(f)$ denotes frequency information of the original signal, H(f) denotes a frequency response characteristic of a blur kernel, and T(f) denotes frequency information of noise. The frequency information $X_\Omega(f)$ of the original signal to be restored may be calculated from Equation 8, as shown in Equation 9 below.

$$X_\Omega(f) = \frac{1}{H(f)}(S(f) - T(f)) \qquad \text{[Equation 9]}$$

If an inverse Fourier transform is applied to Equation 9, deblurred $x_\Omega[i]$ may be obtained.

However, since T(f) that is a noise component in Equation 9 is an unknown component, an error due to T(f)/H(f) may occur even if TO is modeled as a statistical probability distribution. As shown in FIG. 5, a noise component may be amplified due to the uniform blur kernel h[i] in a spatial domain. The frequency response characteristic H(f) for uniform blur kernel h[i] that is frequency-converted may include zero crossing points 590, and impulse components may be caused by the zero crossing points 590 in a reciprocal of the frequency response characteristic H(f). Since the impulse components are multiplied by the noise component, noise may be greatly amplified in a deblurring process.

Figure 6:
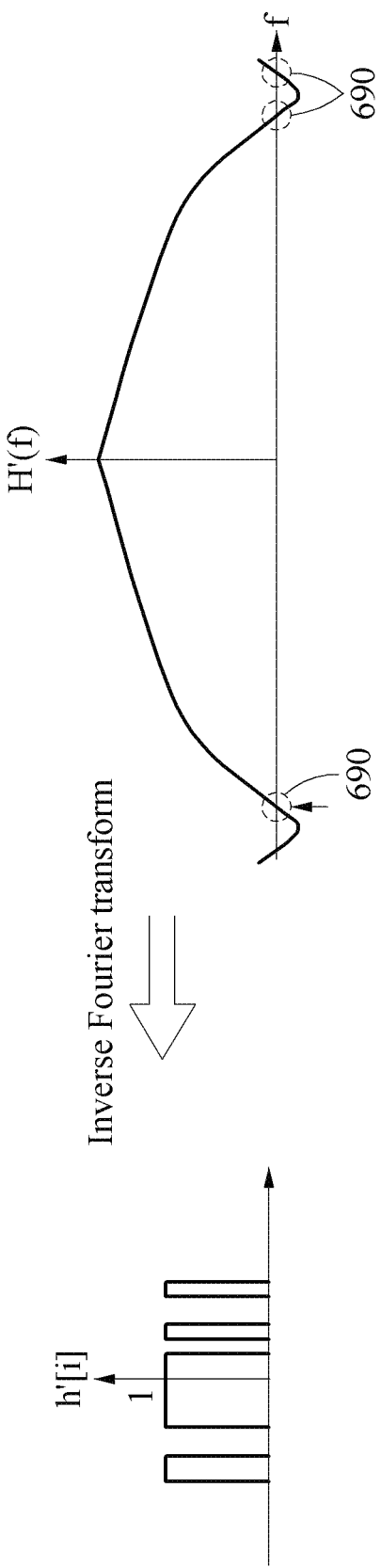
FIG. 6 illustrates a blur kernel of an imaging device including a mask array according to an example embodiment.

FIG. 6 illustrates a blur kernel of an imaging device including a mask array according to an example embodiment.

A blur kernel h'[i] of the imaging device may be designed to suppress a noise component. For example, the blur kernel h'[i] may be designed so that zero crossing points 690 may be minimized in a frequency response characteristic H'(f) of a frequency domain.

The mask array may be disposed between an imaging lens array and a sensing element, and may include mask elements that block light directed in a portion of directions. For example, the mask array may block light directed in a portion of directions among light passing through an MLA and may selectively allow light directed in other directions to pass, to form the blur kernel h'[i].

Figure 7:
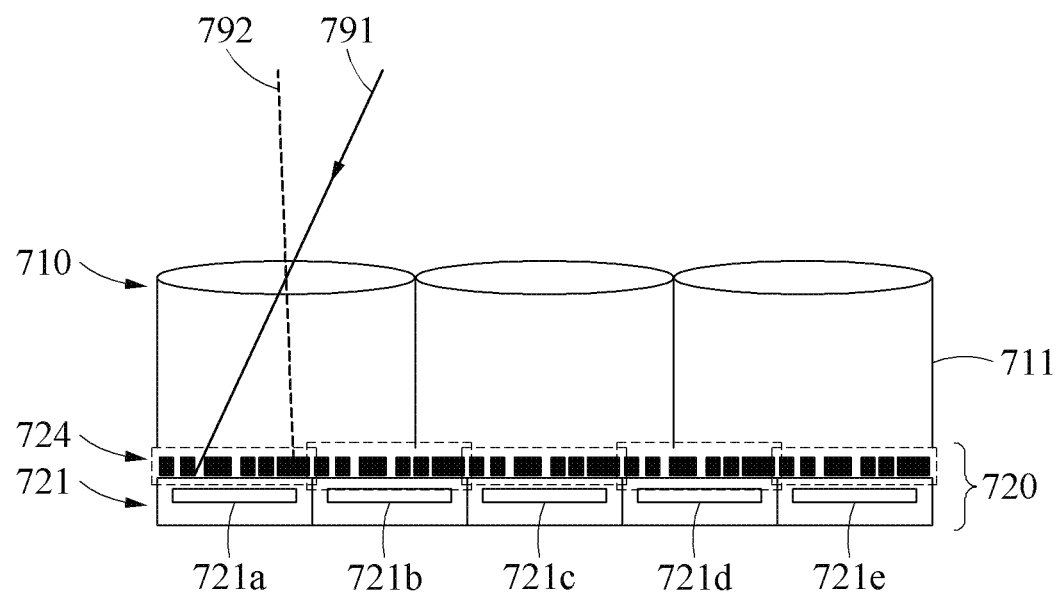
FIG. 7 is a cross-sectional view of an imaging device in which a mask array is disposed according to an example embodiment.

FIG. 7 is a cross-sectional view of an imaging device in which a mask array is disposed according to an example embodiment.

The imaging device may include an imaging lens array 710 and an image sensor 720. The imaging lens array 710 may include imaging optical lenses configured to transmit light received from an outside of the imaging device, and may be disposed as shown in FIG. 1 above. The imaging optical lenses may form an imaging optical system.

The imaging optical system may be an optical system that performs imaging on a sensing array 721, and an optical characteristic may be determined by, for example, a focal length, a size, a shape and a structure of the imaging lens array 710, and/or a geometrical relationship between the imaging lens array 710 and the sensing array 721. For example, the imaging optical system may further include a blocking portion 711 configured to prevent light passing through an individual imaging optical lens from reaching a sensing region covered by another imaging optical lens. Also, the imaging optical system may further include an aperture (not shown) configured to transmit light to an imaging optical lens.

The sensing array 721 may include a plurality of sensing elements configured to sense light received from the outside. The sensing elements may each receive light directed in a plurality of directions, and a light bundle incident on the imaging device in a single direction may be concentrated as rays in the direction by an imaging optical lens. A sensing element belonging to an arbitrary sensing region may receive rays that respectively correspond to the plurality of directions and that are concentrated by an imaging optical lens that covers the sensing region. In FIG. 7, a first ray 791 of a first direction and a second ray 792 of a second direction which are directed toward sensing elements by passing through an imaging optical lens are illustrated as examples.

Since the imaging optical system includes the imaging lens array 710 with a multi-lens structure, as described above, an individual sensing element of the sensing array 721 may sense rays that are received in multiple directions and that overlap with each other. In other words, overlapping of light imaged in the sensing array 721 may be modeled as the blur kernel h' [i] of FIG. 6.

A mask array 724 may include a plurality of mask elements and may be disposed on the sensing array 721. The mask elements may be disposed above a position in which a sensing element of the sensing array 721 is disposed, and may absorb and block a portion or all of light directed to the position. The mask array 724 may modify an imaging optical system corresponding to the blur kernel of FIG. 5 to an optical system corresponding to the blur kernel h' [i] of FIG. 6. The mask array 724 may also be understood as transmitting light passing through an imaging optical lens to the sensing array 721 by coding the light, and may be referred to as the "coded mask array 724". The mask array 724 may be disposed at a position inside the sensing array 721 or a position in contact with the sensing array 721. Although it is desirable that, regardless of a position of the mask array 724, there is no gap between the mask array 724 and sensing elements (for example, a first sensing element 721a through a fifth sensing element 721e), the mask array 724 may be spaced apart from the sensing elements by about 1 micrometer (μm) or less due to a limitation of a manufacturing process.

The plurality of mask elements may be disposed in a pattern in which zero crossing of a frequency response characteristic of a blur kernel is minimized. For example, the first ray 791 passing through the imaging optical lens may be incident on a sensing element through mask elements. The second ray 792 may be incident on a mask element and may be absorbed. The second ray 792 may be a ray that causes zero crossing in the frequency response characteristic of the blur kernel described above with reference to FIG. 6. Thus, the mask array 724 may block rays in a direction causing zero crossing.

The imaging device and/or the image sensor 720 may sense overlapping LF information in a direction selectively filtered through the mask array 724. Thus, the imaging device and/or the image sensor 720 including the mask array 724 may restore an image with reduced noise. While a noise may be caused by a loss of an amount of light due to the mask array 724, a noise suppression effect by a blur kernel modified due to the mask array 724 may be greatly increased. As a result, a quality of the restored image may be enhanced by a masking pattern of the mask array 724.

The plurality of mask elements may be formed and/or disposed according to the masking pattern. The masking pattern may be repeated in units of sensing elements or in units of sensing element groups. A first masking pattern disposed on the first sensing element 721a, a second masking pattern disposed on a second sensing element 721b, a third masking pattern disposed on a third sensing element 721c, a fourth masking pattern disposed on a fourth sensing element 721d, and a fifth masking pattern disposed on the fifth sensing element 721e may be the same.

A design of the masking pattern of the mask array 724 will be described below with reference to FIG. 8.

Figure 8:
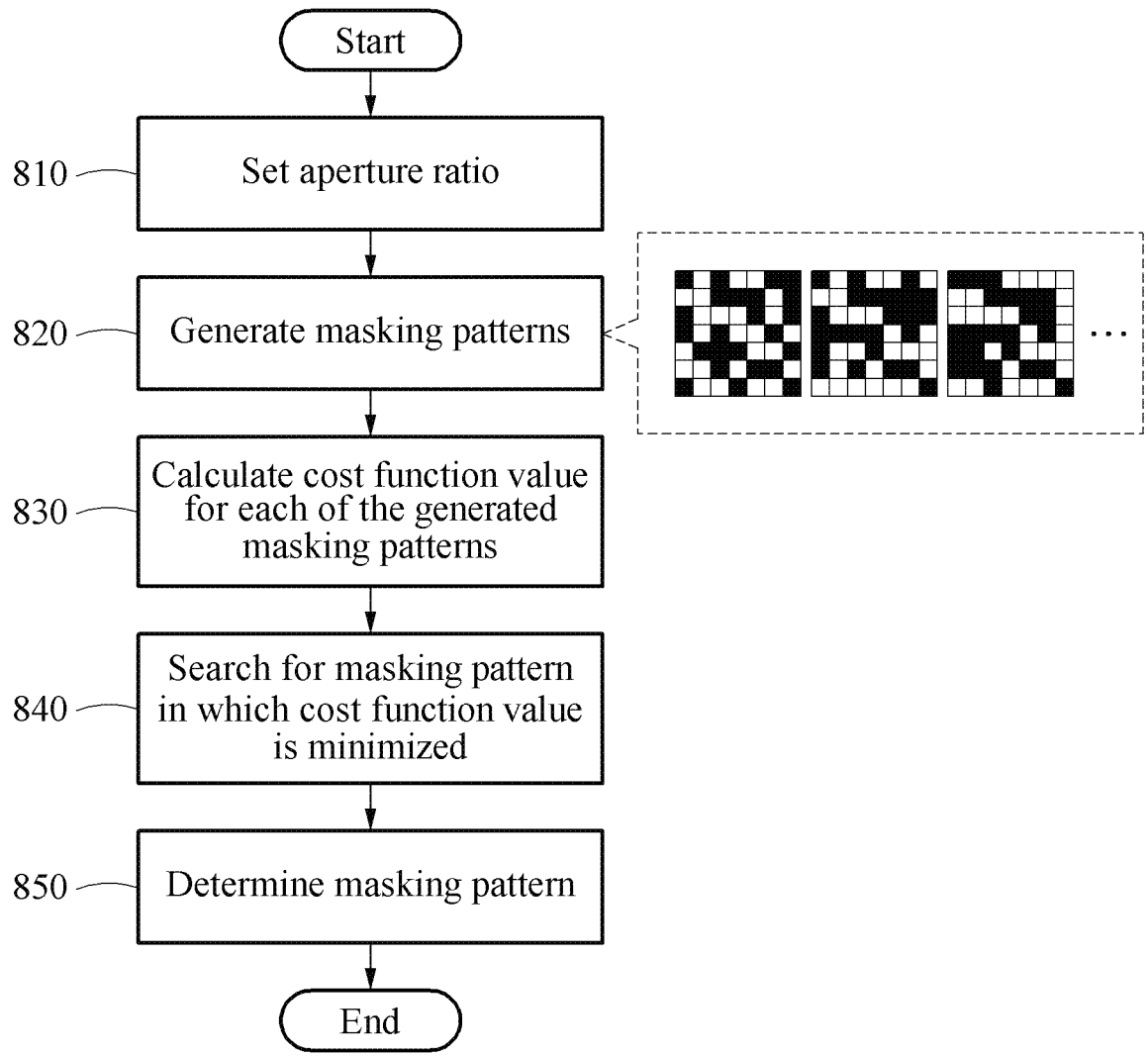
FIG. 8 illustrates a design of a masking pattern of a mask array according to an example embodiment.

FIG. 8 illustrates a method of designing a masking pattern of a mask array according to an example embodiment.

A plurality of mask elements may be formed in a pattern in which a cost function determined based on a frequency response characteristic of a filter is minimized. A masking pattern disposed for each sensing element or for each sensing element group in the mask array may be determined as a pattern in which a Euclidean norm of 1/H(f) that is a reciprocal of a frequency response characteristic of a blur kernel is minimized.

Referring to FIG. 8, in operation 810, a target aperture ratio of the mask array may be set. An aperture ratio may be a ratio of light to be transmitted with respect to light incident on a pattern region corresponding to the masking pattern, and may represent a ratio of an area of an open region with respect to an area of the pattern region. The pattern region may be a region corresponding to a sensing element or a sensing element group in the mask array. The aperture ratio may be set to, for example, a ratio of 10% to 90%, or a ratio of 30% to 70%. Desirably, the aperture ratio may be set to a ratio of 40% to 60%.

In operation 820, a masking pattern according to the set aperture ratio may be generated. The mask array may be segmented into pattern regions corresponding to individual sensing elements, and each of the pattern regions may be segmented into a plurality of spaces. An individual space may define a unit region in which a mask element may be formed. A space in which a mask element is formed may be referred to as a "closed space" and a space in which a mask element is not formed may be referred to as an "open space". In other words, a closed space in the mask array may absorb all or a portion of light, and an open space may allow light to pass. Masking patterns in which open spaces and closed spaces are combined based on the target aperture ratio set in operation 810 may be generated. If a pattern region includes "N×N" spaces and the target aperture ratio is 50%, "N²/2" masking patterns may be generated. Closed spaces may be used to classify each of mask elements according to a transmittance thereof (or a transmission level), which will be described below with reference to FIG. 10.

An example of generating an entire combination of the mask patterns is illustrated in operation 820 for convenience of description, however, example embodiments are not limited thereto. In an example, pre-defined patterns may be combined, or a masking pattern to be searched for may be generated by swapping or toggling between patterns within given combinations. For example, if a condition that patterns are symmetric is added, a pattern may be searched for with respect to repeated regions only, and a generated pattern may be used symmetrically.

In operation 830, a cost function value may be calculated for each generated masking patterns. A cost function based on a reciprocal of the frequency response characteristic of the blur kernel described above with reference to FIGS. 5 and 6 may be used. Due to the mask elements formed based on the masking pattern, a blur kernel of an imaging optical system may be modified, and a frequency response characteristic H'(f) of the modified blur kernel may be calculated. A cost function based on a reciprocal 1/H'(f) of the frequency response characteristic H'(f) of the modified blur kernel may be determined based on a Euclidean norm of a reciprocal of a function representing a frequency response characteristic, a variance of the reciprocal, and/or a reciprocal of a Euclidean norm of the function. For example, a cost function E shown in Equation 10 below may be used $$E = \alpha \cdot \left\| \frac{1}{H'(f)} \right\|_2 + \beta \cdot \frac{1}{\|H'(f)\|_0} + \gamma \cdot \mathrm{var}\left( \frac{1}{H'(f)} \right) \qquad \text{[Equation 10]}$$

In Equation 10, $$\left\| \frac{1}{H'(f)} \right\|_2$$

denotes the Euclidean norm of the reciprocal of the frequency response characteristic H'(f). A number of zero crossing points may be minimized by $$\left\| \frac{1}{H'(f)} \right\|_2 \cdot \frac{1}{\|H'(f)\|_0}$$

denotes a reciprocal of a Euclidean norm of the frequency response characteristic H'(f). By $$\frac{1}{\|H'(f)\|_0},$$

a value of the frequency response characteristic H'(f) may be designed not to be zero.

$$\text{var}\left(\frac{1}{H'(f)}\right)$$

denotes a variance of the reciprocal of the frequency response characteristic H'(f). 1/H' (f) may be designed so that the variance may be minimized in a frequency domain. The cost function E of Equation 10 may be a weighted average value of individual cost factors, and $\alpha$, $\beta$, and $\gamma$ denote weights.

In operations 840 and 850, a masking pattern in which a cost function value is minimized may be searched for and determined. Cost function values for each of masking patterns with combinations of closed spaces and open spaces may be calculated in a given condition, and a masking pattern in which noise amplification is minimized by a cost function may be searched for. The masking pattern found as a result of searching may be determined as a pattern of the mask array in operation 850. An image sensor may include a mask array in which the found masking pattern is repeated.

Figure 9:
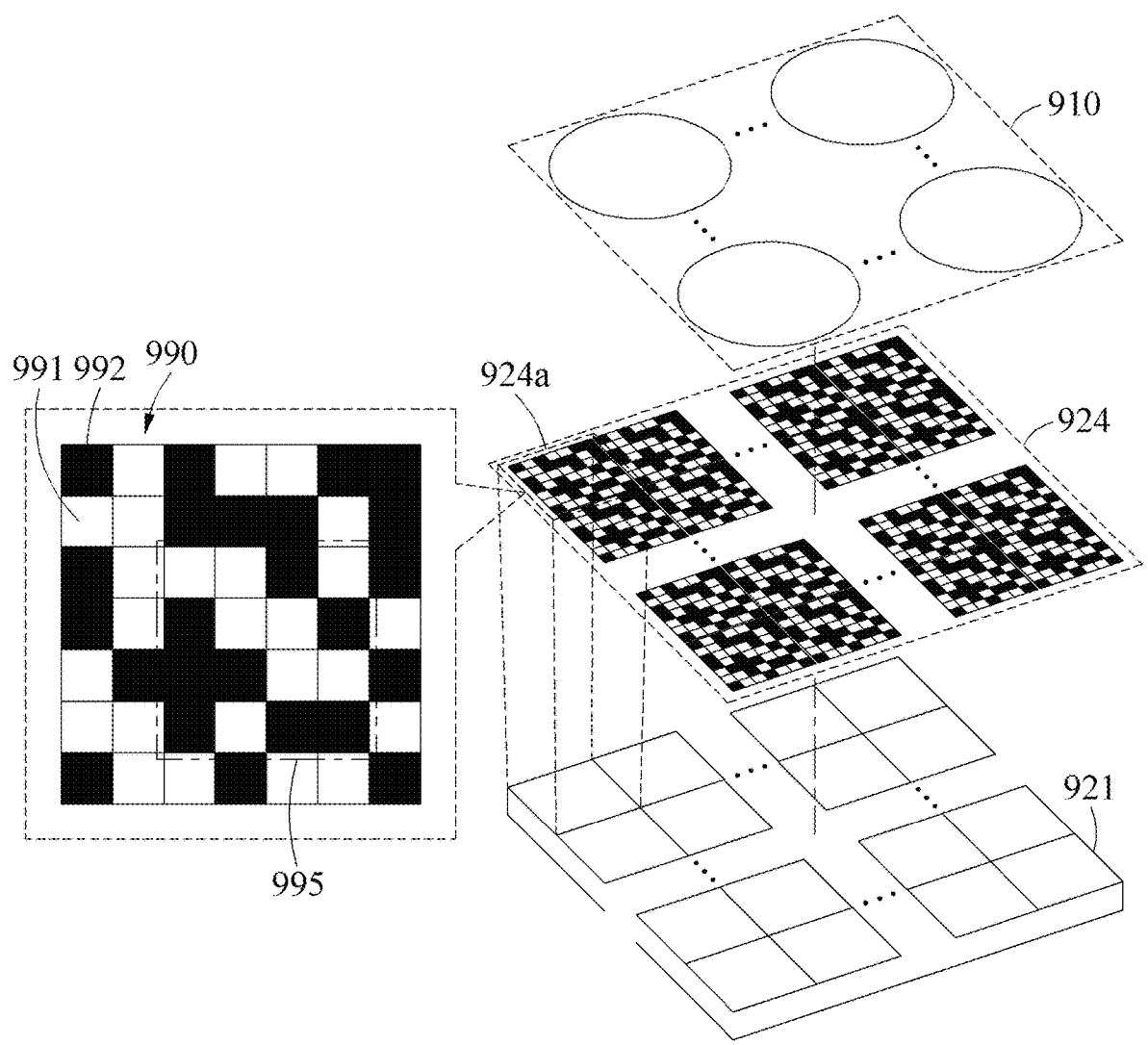
FIGS. 9 and 10 illustrate examples of mask arrays according to an example embodiment.
Figure 10:
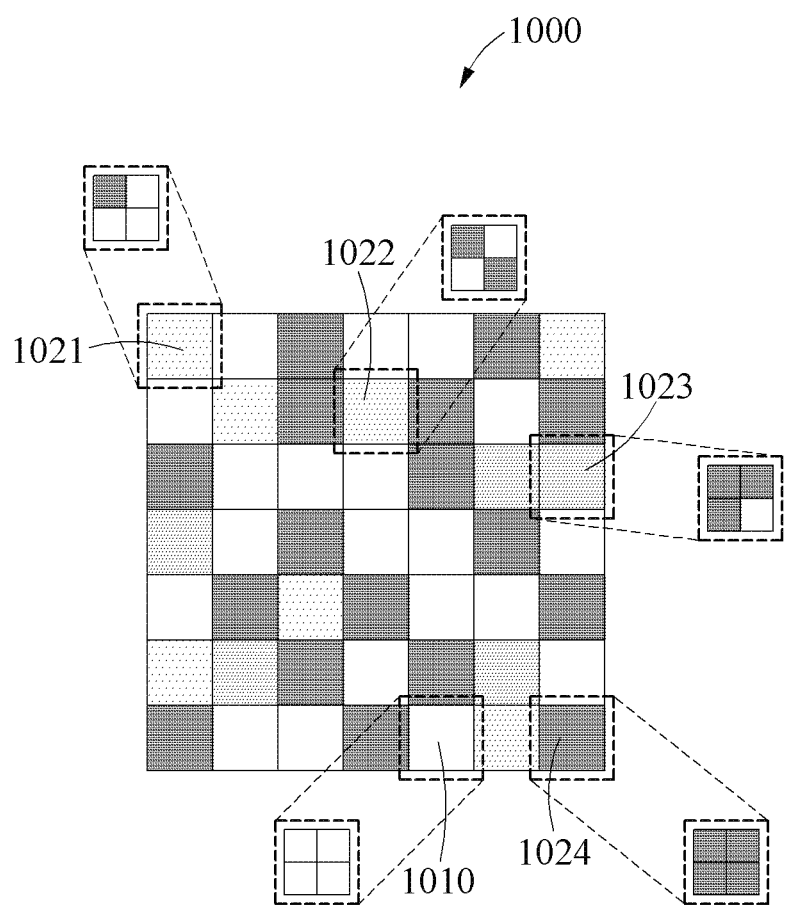

FIGS. 9 and 10 illustrate examples of mask arrays according to an example embodiment.

FIG. 9 illustrates an example in which a transmission state of light for each individual space of a mask array 924 is classified as a binary state. In other words, an open space 991 may allow all light incident thereon to pass, and a closed space 992 may absorb all light incident thereon.

The mask array 924 may be segmented into a plurality of group regions. A group region 924a may be a region in the mask array 924 which covers a single sensing element or a plurality of sensing elements of a neighboring sensing array 921. Although an example in which the group region 924a of the mask array 924 covers a single sensing element is illustrated in FIG. 9, the group region 924a of the mask array 924 may cover a sensing element group including a plurality of sensing elements grouped to represent a single pixel, which will be described below with reference to FIG. 11. A masking pattern 990 of the group region 924a may be repeated. For example, all the plurality of group regions of the mask array 924 may have the same masking pattern 990.

A pattern region of the mask array 924 corresponding to an individual sensing element may include an aperture region and a masked region. The aperture region may occupy an area corresponding to an aperture ratio with respect to a total area of a corresponding region, and the masked region may occupy the remaining area. For example, the masking pattern 990 may be a pattern designed at a target aperture ratio of 50%. The masking patterns 990 may be divided into a total of "7×7=49" spaces and may include "24" closed spaces 992 and "25" open spaces.

Also, the masking pattern 990 may secure an aperture ratio of a partial region 995 as well as an aperture ratio relative to the total area. An area occupied by an aperture part in the partial region 995 may be greater than or equal to an area corresponding to a set aperture ratio. The partial region 995 of the masking pattern 990 may include "4×4=16" spaces in total including "8" closed spaces 992 and "8" open spaces 991, and accordingly the aperture ratio may be 50%. Even when a partial region including "4×4=16" spaces at another position of the masking pattern 990 is considered, the aperture ratio may be 50%. In other words, the masking pattern 990 may be designed so that regions with a target aperture ratio may be uniformly distributed.

In addition, a number of spaces included in a region corresponding to an individual masking pattern 990 may be greater than or equal to a number of imaging optical lenses of an imaging optical system. As described above with reference to FIG. 5, information sensed by a sensing element may be blurred in proportion to a number of lenses in an MLA. To restore an image with a high resolution by offsetting a blur level proportional to the number of lenses, a pattern region may include spaces corresponding to the number of lenses to provide a deblurring function. When a lens array 910 includes "7×7=49" imaging optical lenses, the masking pattern 990 may include at least "7×7=49" spaces. Information transmitted to the sensing array 921 through the lens array 910 may be blurred by 1/49, and the masking pattern 990 may provide a corresponding deblurring capacity of 49 times.

FIG. 10 illustrates an example in which an individual mask element of a mask array has one of two or more transmission levels. A mask element may block and/or absorb a portion of light that reaches the mask element, and a transmission level may indicate a level and/or a proportion of transmitting incident light. A mask element may be formed and/or disposed along a plane of the mask array based on the above-described masking pattern.

An individual mask element may be segmented into a plurality of regions, and a transmittance of the individual mask element may be determined based on a ratio of an open region and a closed region among the plurality of regions. FIG. 10 illustrates a masking pattern 1000 designed with five transmission levels. Each mask element may be segmented into four regions with the same size. A space 1010 in which a mask element is not formed may have a first transmission level (for example, 100% transmission). A first mask element 1021 may have a second transmission level (for example, 75% transmission), and may include a single closed space. A second mask element 1022 may have a third transmission level (for example, 50% transmission), and may include closed regions corresponding to half (for example, two regions) of regions. A third mask element 1023 may have a fourth transmission level (for example, 25% transmission), and may include three closed regions. A fourth mask element 1024 may have a fifth transmission level (for example, 0% transmission) and all regions of the fourth mask element 1023 may be closed regions. An aperture ratio determined based on a number of open regions and a number of closed regions or an area of an open region and an area of a closed region may be interpreted as a ratio of an amount of light to be transmitted to an amount of light incident on a region.

Figure 11:
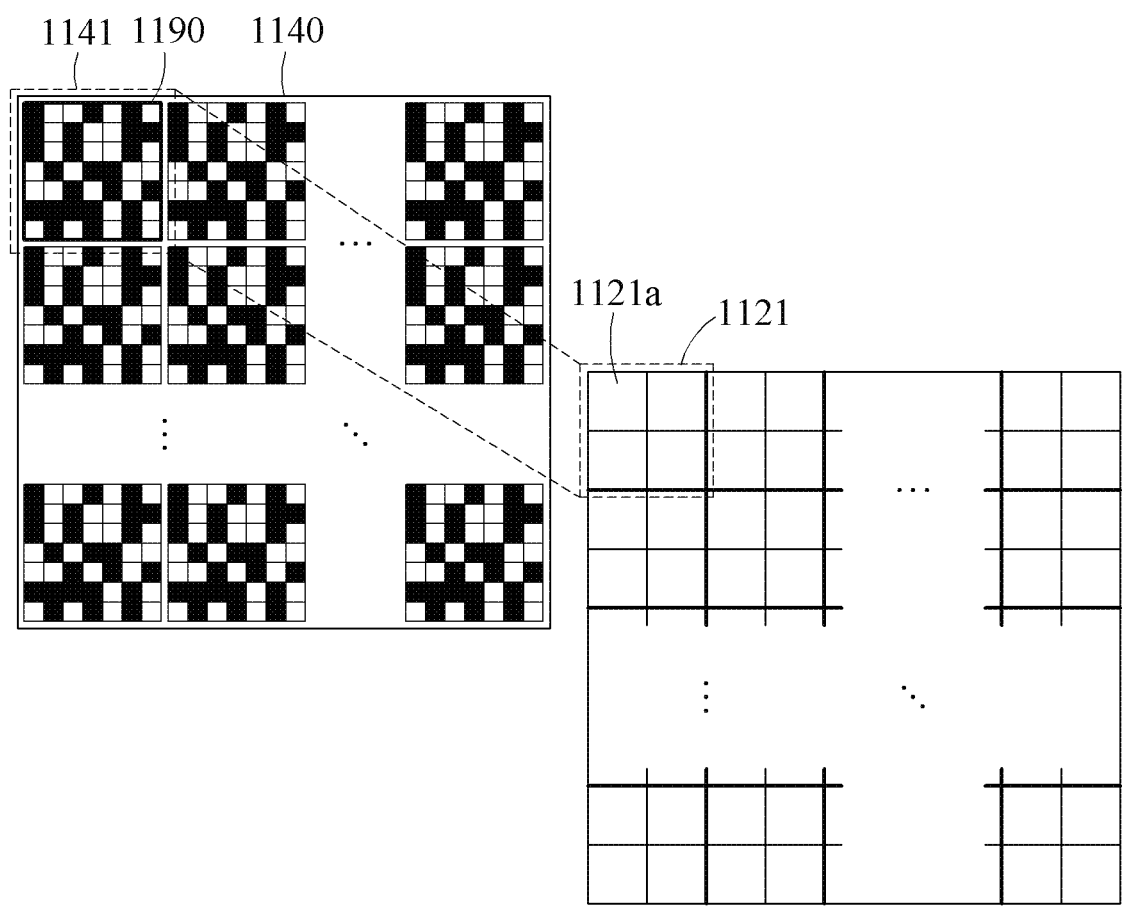
FIG. 11 illustrates an arrangement of masking patterns for each sensing element group in an image sensor according to an example embodiment.

FIG. 11 illustrates an arrangement of masking patterns for each sensing element group in an image sensor according to an example embodiment.

An example in which a single sensing element is covered by each group region of a mask array is illustrated in FIG. 9, and an example in which a sensing element group 1121 including a plurality of sensing elements 1121a is covered by each group region 1141 of a mask array 1140 is illustrated in FIG. 11. In the example of FIG. 11, a pixel value of an image pixel may be determined based on values sensed by the sensing element group 1121 (for example, "2×2" sensing elements 1121a). The mask array 1140 may include a plurality of masking patterns. A single masking pattern may be disposed per sensing element as shown in FIG. 9, while a single masking pattern 1190 may be disposed per sensing element group 1121 as shown in FIG. 11. All the masking patterns of the mask array 1140 may have the same shape.

Figure 12A:
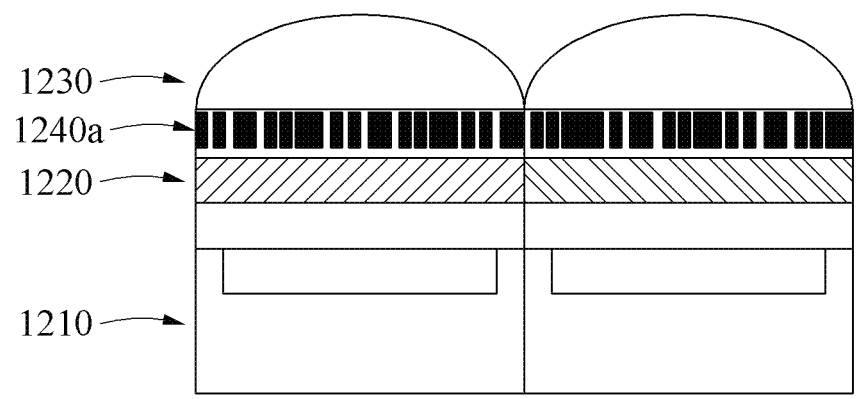
FIGS. 12A and 12B illustrate examples of an arrangement of a mask array according to an example embodiment.
Figure 12B:
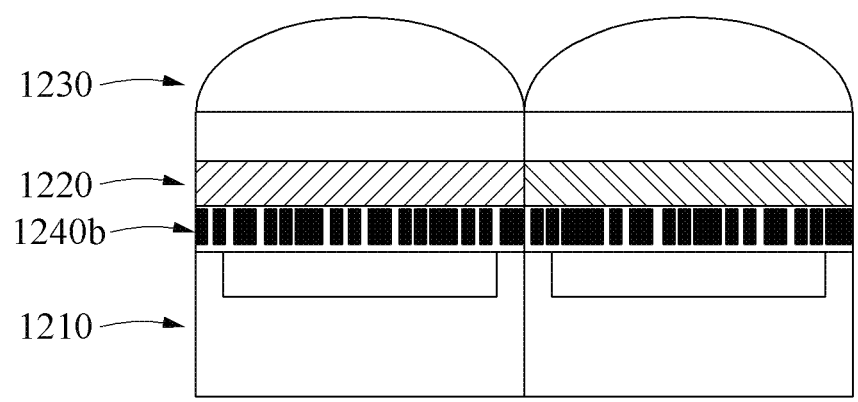

FIGS. 12A and 12B illustrate examples of an arrangement of a mask array according to an example embodiment.

A mask array may be disposed at various positions that allow light directed in a predetermined direction in a sensor for a camera to be blocked and/or overlap. Referring to FIG. 12A, a mask array 1240a may be disposed on a color filter 1220 between a condensing lens array 1230 and a sensing array 1210. Referring to FIG. 12B, a mask array 1240b may be disposed between a color filter 1220 and a sensing array 1210. As described above, the mask array 1240b and the sensing array 1210 may be spaced apart from each other by 1 μm or less.

Figure 13:
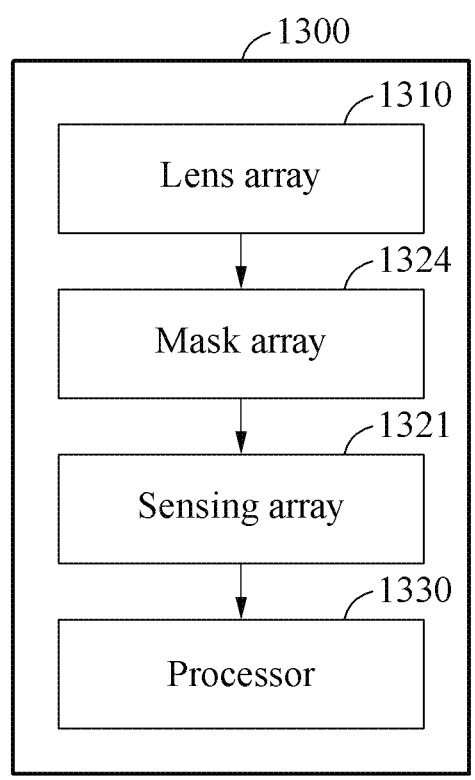
FIG. 13 is a block diagram illustrating a configuration of an imaging device according to an example embodiment.

FIG. 13 is a block diagram illustrating a configuration of an imaging device according to an example embodiment.

An imaging device 1300 may include a lens array 1310 and an image sensor.

The lens array 1310 may include imaging optical lenses configured to transmit light received from the outside.

The image sensor may be a sensor that senses light passing through the lens array 1310. The image sensor may include a mask array 1324, a sensing array 1321, and a processor 1330. The mask array 1324 and the sensing array 1321 have been described above with reference to FIGS. 1 through 12B, and accordingly further description thereof is not repeated herein.

The processor 1330 may restore an image based on sensing information sensed by sensing elements. The processor 1330 of the image sensor may also be referred to as, for example, an image signal processor (ISP). The processor 1330 may generate frequency information by transforming sensing information to a frequency domain, and may generate deblurred frequency information by dividing the frequency information by a frequency conversion result of a blur kernel corresponding to a masking pattern of the mask array 1324. The processor 1330 may restore a high-resolution image by inversely transforming the deblurred frequency information to a time domain. The sensing information may be used in, for example, depth estimation for a subject, refocusing, dynamic range imaging, and capturing a high-sensitivity image in a low-illuminance environment, in addition to image restoration.

Figure 14:
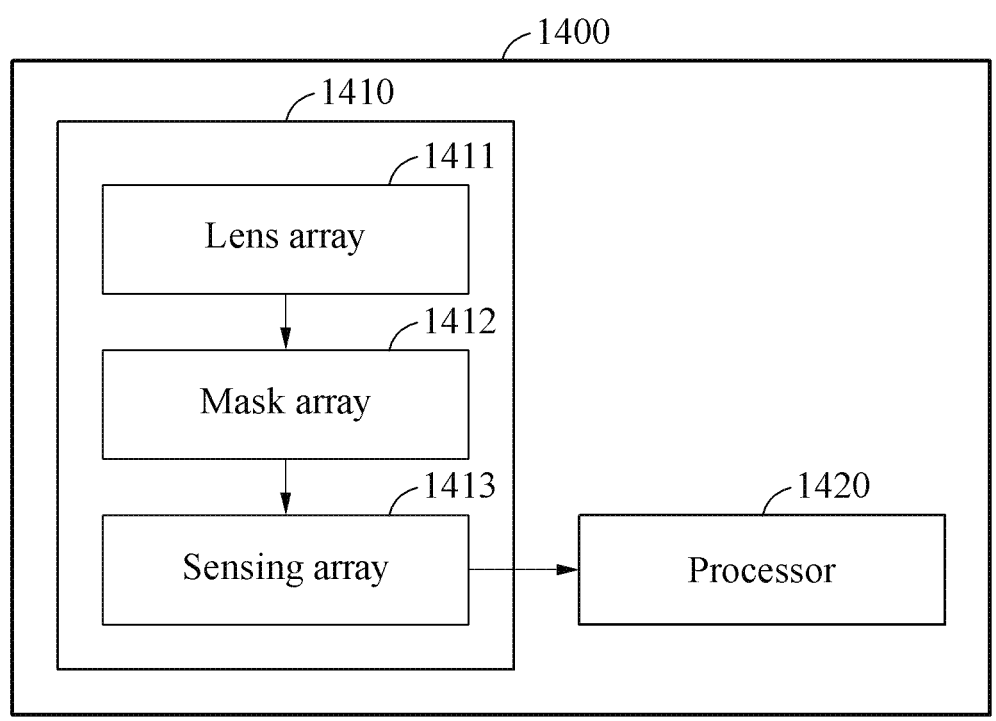
FIG. 14 is a block diagram illustrating a configuration of an electronic terminal according to an example embodiment.

FIG. 14 is a block diagram illustrating a configuration of an electronic terminal according to an example embodiment.

An electronic terminal 1400 may include an imaging module 1410 and a processor 1420.

The imaging module 1410 may include a lens array 1411 and an image sensor. The image sensor may include a mask array 1412 and a sensing array 1413. Unlike the processor 1330 included in the image sensor as shown in FIG. 13, FIG. 14 illustrates that a processor is located independently of the image sensor. Since the lens array 1411, the image sensor, and the processor 1420 have been described above, further description is not repeated herein. The processor 1420 of FIG. 14 may be an application processor (AP).

Figure 15:
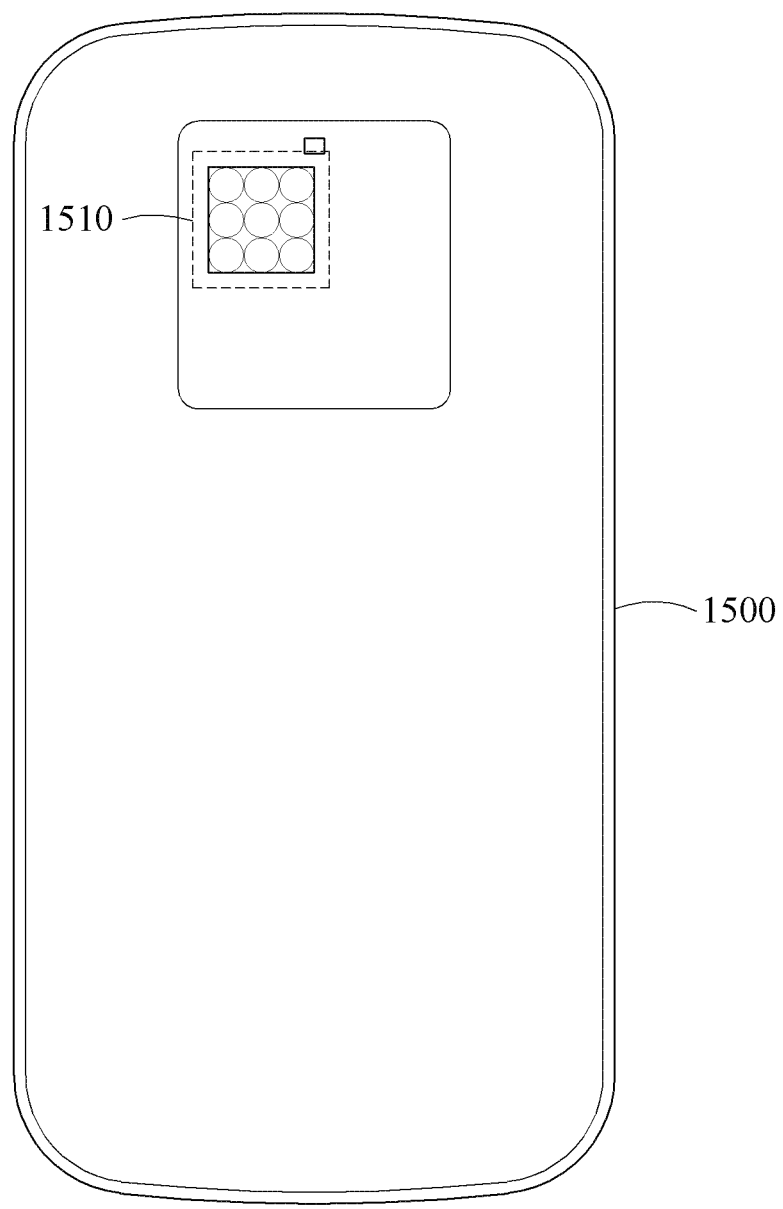
FIGS. 15 and 16 are diagrams illustrating examples of a device in which an image sensor is to be implemented according to example embodiments.
Figure 16:
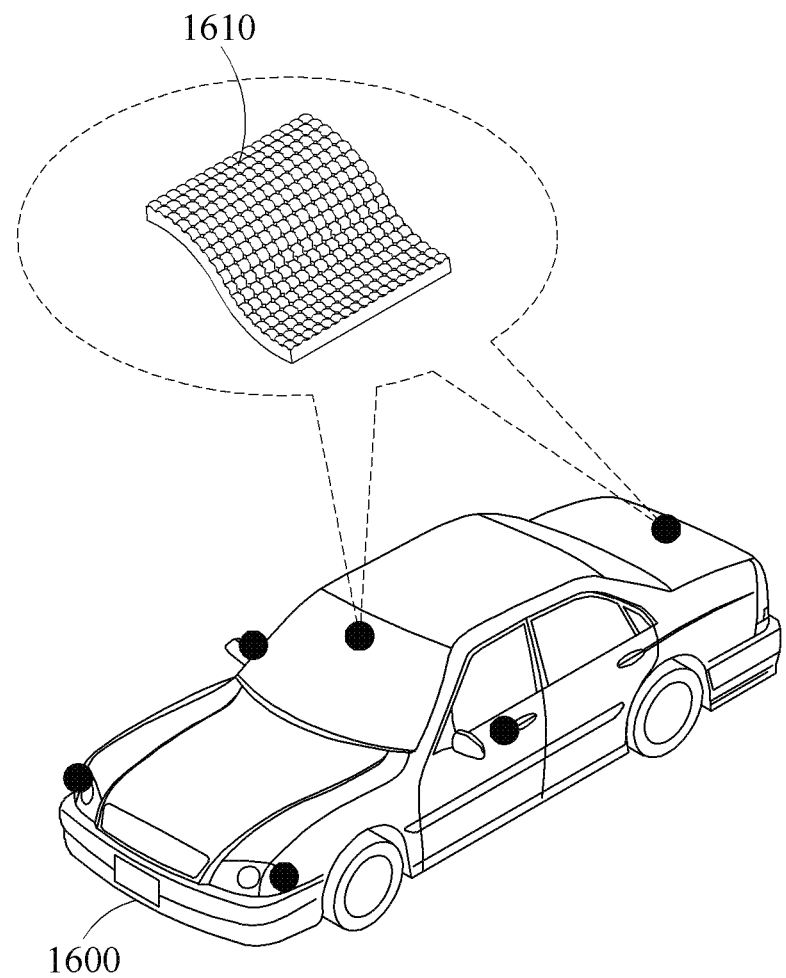

FIGS. 15 and 16 are diagrams illustrating examples of a device in which an image sensor is to be implemented according to example embodiments.

An image sensor and/or imaging device may be applied to various technical fields. A lens array including a plurality of lenses, and a sensor including a plurality of sensing elements may be designed to be spaced apart from each other by a relatively short focal length, the imaging device may be implemented as an ultra-thin camera with a small thickness and a large sensor for high-definition capturing.

The image sensor and/or imaging device may be mounted on a mobile terminal. The mobile terminal may be a movable terminal that is not fixed at any location, and may include, for example, a vehicle, an artificial intelligence speaker, and a portable device such as a smartphone, a tablet personal computer (PC) or a foldable smartphone.

As illustrated in FIG. 15, an imaging module 1510 may be applied to a front camera or a rear camera of a smartphone. The imaging module 1510 may have a structure in which a large full frame sensor and an MLA are combined, and may be applied to a camera of a smartphone.

Also, the imaging module 1510 may be implemented in a vehicle in a thin structure or curved structure. As illustrated in FIG. 16, an imaging device 1610 may be implemented as a front camera or a rear camera having a curved shape in a vehicle 1600. In addition, the imaging device 1610 may also be applied to a field, for example, such as a digital single-lens reflect (DSLR) camera, a drone, a closed-circuit television (CCTV), a webcam camera, a panoramic camera, a movie or broadcast video camera, a virtual reality (VR)/augmented reality (AR) camera, a flexible/stretchable camera, a compound-eye camera, or a contact lens type camera. Also, the imaging device 1610 may also be applied to multi-frame super-resolution image restoration for increasing a resolution based on information about a plurality of captured frames.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art would appreciate that a processing device may include multiple processing elements and multiple types of processing elements. For example, a processing device may include multiple processors or a processor and a controller. In addition, different processing configurations are possible, such a as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as compact disc read-only memories (CD ROMs) and digital versatile disc (DVDs); magneto-optical media such as optical discs; and hardware devices that are specially configured to store and perform program instructions, such as a read-only memory (ROM), a random access memory (RAM), a flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image sensor comprising:
  a mask array comprising a plurality of mask elements, the plurality of mask elements being configured to, among light passing through imaging optical lenses and incident onto the mask array in a plurality of directions, block light in a first portion of the plurality of directions, and allow light in a second portion of the plurality of directions to pass therethrough; and
  a sensing array comprising a plurality of sensing elements, the plurality of sensing elements being configured to sense the light passing through the imaging optical lenses and the mask array,
  wherein in each partial region of the mask array, an area occupied by an aperture is greater than or equal to an area corresponding to a set aperture ratio.

2. The image sensor of claim 1, further comprising:
  a color filter provided above the sensing array and configured to filter light of a portion of wavelength bands from light incident on each of the plurality of sensing elements,
  wherein the mask array is provided between the color filter and the sensing array.

3. The image sensor of claim 1, further comprising:
  a condensing lens array provided above the sensing array,
  wherein the mask array is provided between the condensing lens array and the sensing array.

4. The image sensor of claim 1, wherein the mask array and the plurality of sensing elements are spaced apart from each other by 1 micrometer (μm) or less.

5. The image sensor of claim 1, wherein the mask array and the plurality of sensing elements are in contact with each other.

6. The image sensor of claim 1, wherein a first region of the mask array corresponding to a sensing element of the plurality of sensing elements comprises:
  an aperture region occupying an area corresponding to an aperture ratio with respect to a total area of the first region; and
  a masked region occupying a remaining area of the first region, the plurality of mask elements being provided in the masked region.

7. The image sensor of claim 6, wherein the aperture ratio with respect to the total area of the first region is in a range from an aperture ratio of about 40% with respect to the total area of the first region to an aperture ratio of about 60% with respect to the total area of the first region.

8. The image sensor of claim 1, wherein
  the mask array is segmented into a plurality of group regions corresponding to a plurality of sensing element groups, and
  each of the plurality of group regions in the mask array is configured to cover a sensing element group, the sensing element group comprising a plurality of sensing elements that are grouped to represent a single pixel.

9. The image sensor of claim 8, wherein a masking pattern of a group region is repeated in the mask array.

10. The image sensor of claim 8, wherein all of the plurality of group regions in the mask array have a same masking pattern.

11. The image sensor of claim 1, wherein a number of spaces included in a masking pattern, which is repeated in the mask array, is greater than or equal to a number of the imaging optical lenses.

12. The image sensor of claim 1, wherein the plurality of mask elements have two or more transmission levels.

13. The image sensor of claim 1, wherein
each of the plurality of mask elements is segmented into a plurality of regions, and
a transmittance of each of the plurality of mask elements is determined based on a ratio of an open region and a closed region among the plurality of regions.

14. The image sensor of claim 1, further comprising:
a processor configured to restore an image based on sensing information sensed by the plurality of sensing elements.

15. The image sensor of claim 1, wherein
the mask array comprises a plurality of masking patterns, and
each of the plurality of masking patterns is configured to cover a sensing element group, the sensing element group comprising two or more sensing elements in the sensing array.

16. A camera device comprising:
an imaging lens array comprising imaging optical lenses, the imaging optical lenses configured to transmit light received from an outside of the camera device;
a sensing array comprising a plurality of sensing elements, the plurality of sensing elements being configured to sense light passing through the imaging lens array; and
a mask array comprising a plurality of mask elements, the mask array being provided between the imaging lens array and the sensing array,
wherein a first region of the mask array corresponding to a sensing element of the plurality of sensing elements comprises:
an aperture region occupying an area corresponding to an aperture ratio with respect to a total area of the first region; and
a masked region occupying a remaining area in the first region, the plurality of mask elements provided in the masked region.

17. The camera device of claim 16, wherein the mask array is provided at one of a position inside the sensing array and a position in contact with the sensing array on the plurality of sensing elements.

18. The camera device of claim 16, wherein in each partial region of the mask array, an area occupied by an aperture is greater than or equal to an area corresponding to a set aperture ratio.

19. The camera device of claim 16, wherein a masking pattern of a group region is repeated in the mask array.

20. The camera device of claim 16, further comprising:
a processor configured to generate frequency information by transforming sensing information sensed by the plurality of sensing elements to a frequency domain, to generate deblurred frequency information by dividing the frequency information by a frequency conversion result of a blur kernel, the blur kernel corresponding to a masking pattern of the mask array, and to restore a high-resolution image by inversely transforming the deblurred frequency information to a time domain.

21. An image sensor comprising:
a mask array comprising a plurality of mask elements, the plurality of mask elements being configured to, among light passing through imaging optical lenses and incident onto the mask array in a plurality of directions, block light in a first portion of the plurality of directions, and allow light in a second portion of the plurality of directions to pass therethrough;
a sensing array comprising a plurality of sensing elements, the plurality of sensing elements being configured to sense the light passing through the imaging optical lenses and the mask array; and
a processor configured to restore an image based on sensing information sensed by the plurality of sensing elements,
wherein the processor is further configured to generate frequency information by transforming the sensing information to a frequency domain, to generate deblurred frequency information by dividing the frequency information by a frequency conversion result of a blur kernel, the blur kernel corresponding to a masking pattern of the mask array, and to restore a high-resolution image by inversely transforming the deblurred frequency information to a time domain.

* * * * *